(12) United States Patent
Lee

(10) Patent No.: US 9,128,556 B2
(45) Date of Patent: Sep. 8, 2015

(54) DISPLAY DEVICE HAVING A BUILT-IN TOUCH INPUT MEANS

(76) Inventor: Sung Ho Lee, Hwaseong-si (KR)

( * ) Notice: Subject to any disclaimer, the term of this patent is extended or adjusted under 35 U.S.C. 154(b) by 910 days.

(21) Appl. No.: 13/383,519

(22) PCT Filed: Jul. 13, 2010

(86) PCT No.: PCT/KR2010/004527
§ 371 (c)(1),
(2), (4) Date: Jan. 11, 2012

(87) PCT Pub. No.: WO2011/007995
PCT Pub. Date: Jan. 20, 2011

(65) Prior Publication Data
US 2012/0120020 A1    May 17, 2012

(30) Foreign Application Priority Data
Jul. 13, 2009  (KR) .......................... 10-2009-0063339

(51) Int. Cl.
*G06F 3/041* (2006.01)
*G06F 3/044* (2006.01)
*G02F 1/1333* (2006.01)

(52) U.S. Cl.
CPC .............. *G06F 3/0412* (2013.01); *G06F 3/044* (2013.01); *G02F 1/13338* (2013.01)

(58) Field of Classification Search
CPC ....... G06F 3/0412; G06F 3/044; G06F 3/045; G06F 3/0416; G06F 1/1613; G06F 1/1643; G06F 1/1684; G06F 2203/04103; G06F 2203/04111; G06F 3/02; G06F 3/041; G06F 3/0414; G06F 3/047
See application file for complete search history.

(56) References Cited

U.S. PATENT DOCUMENTS

| | | | | |
|---|---|---|---|---|
| 2002/0141227 A1* | 10/2002 | Ema | ............................... | 365/149 |
| 2006/0001655 A1* | 1/2006 | Tanabe | ........................... | 345/176 |
| 2007/0070047 A1* | 3/2007 | Jeon et al. | ..................... | 345/173 |
| 2009/0273578 A1* | 11/2009 | Kanda et al. | .................. | 345/174 |
| 2009/0284484 A1* | 11/2009 | Hwang et al. | ................. | 345/173 |

FOREIGN PATENT DOCUMENTS

| | | |
|---|---|---|
| KR | 10-2007--0034720 A1 | 3/2007 |
| KR | 10-2007-0090414 A1 | 9/2007 |
| KR | 10-2009-0028627 A1 | 3/2009 |

* cited by examiner

*Primary Examiner* — Gerald Johnson
(74) *Attorney, Agent, or Firm* — Novick, Kim & Lee, PLLC; Jae Youn Kim

(57) ABSTRACT

This disclosure provides a display device having a built-in touch input unit, the display device including: a lower substrate; an upper substrate; a plurality of first signal lines and second signal lines; touch cells that are formed in a plurality of areas, respectively including a conductive pad that forms an electrostatic capacity between a touch input means and the conductive pad when the touch input means approaches to the conductive pad within a predetermined distance (d) in each divided area, and at least a 3-terminal type switching element whose gate electrode is connected to the conductive pad; and a touch position detector that transmits and receives position detection signals to and from the first signal lines and the second signal lines, and detects whether output signals of the switching element are changed by capacitance that is formed between the touch input means and the conductive pad.

19 Claims, 12 Drawing Sheets

… … 
DISPLAY DEVICE HAVING A BUILT-IN TOUCH INPUT MEANS

TECHNICAL FIELD

The invention relates to a display device having a built-in touch input unit, and more particularly, to a display device having a built-in touch input unit of a new structure in which touch components are installed on an upper substrate of the display device to thus cause thicknesses of the display device not to be increased, and the touch components can be arranged on the same vertical line as those of components of the display device, to thus prevent transmissivity from lowering.

BACKGROUND ART

Usually, a touch panel is an input device attached onto a display device such as LCD (Liquid Crystal Display), PDP (Plasma Display Panel), OLED (Organic Light Emitting Diode), and AMOLED (Active Matrix Organic Light Emitting Diode) and generates a signal corresponding to a touch point when an object such as a finger or pen contacts the touch panel. The touch panel is very widely used for portable devices, industrial devices, DID (Digital Information Device) and so on.

As described before, the conventional touch panel is additionally installed on the upper surface of the completed display device and is made separately from the display device. As described above, the conventional technology of additionally installing the touch panel on the upper surface of the display device has caused an increase in the thickness of the whole display device to thus lower a product competitive power, and has lowered transmissivity due to addition of the touch panel to thus deteriorate a display quality of the display device. In addition, separately different processes of manufacturing the display device and the touch panel and a process of assembling two devices different from each other, have caused an increase of a manufacturing cost.

Meanwhile, in order to solve the above problems, there has been an attempt to have touch components in a display device. Fox example, in the case of a liquid crystal display (LCD), signal lines for detecting touch inputs are arranged and wired on a thin film transistor (TFT) substrate that is a lower substrate, and a plurality of detection electrodes that are connected to the signal lines and disposed at a distance from each other are formed. A common electrode is formed all over the whole lower surface on a collar auxiliary signal line substrate that is an upper substrate. A protrusion portion connected to the common electrode is installed to protrude downwards. In addition, when pressure is applied to the upper substrate, it is detected whether or not the protrusion portion contacts the detection electrodes, to thus detect a touch input. The touch components are installed in the display device, using the thin film transistor (TFT) substrate and a color auxiliary signal line substrate. Accordingly, the touch components can be installed without a thickness increment of the display device. Further, the display device and the touch input unit can be manufactured together with a single manufacturing process.

Meanwhile, in the case of a display device such as a conventional LCD or AMOLED, gate lines and data lines are arranged on a thin film transistor (TFT) substrate that is a lower substrate, and components such as pixels, pixel electrodes, and TFTs. Thus, in the case that touch components are installed on the lower substrate of the display device, the touch components have a very complicated structure on the lower substrate of the display device. This makes a manufacturing process complex, to thereby accompany various kinds of problems of deteriorating a yield rate greatly and declining an insulation between the components.

In addition, as components for screen display and detecting touch inputs are mounted together on the lower substrate of the display device, transmissivity of a display panel is greatly lowered. Furthermore, it also becomes factors of causing rise of a process expense and decline of a yield rate to form protrusion portions electrically connected with a common electrode over a number of areas on the lower surface of the upper substrate.

In addition, liquid crystal, organic materials, plasma gas, etc., are sealed up in a display device according to kind of the display device. Since the display device detects touch inputs using bends of the upper substrate, cracks may frequently happen on real parts of the display device, and durability of the display device becomes greatly weak. In addition, when a touch input occurs, palpitation of the screen may be caused.

In addition, since protrusion portions that are projected downwards are formed on the lower surface of the upper substrate, a manufacturing process of the upper substrate is also complicated. The display device should also maintain an exact cell gap between the protrusion portion of the upper substrate and the detection electrode of the lower electrode. For this reason, an additional process of forming a planarization layer on the lower substrate is needed. In spite of using the planarization layer, it is very difficult to keep the cell gap strictly between the protrusion portion and the detection electrode, and problems of declining a yield rate, shortening a lifetime, losing a touch signal may be induced.

DISCLOSURE

Technical Problem

In order to solve the above-mentioned problems of conventional art, it is an object of the present invention to provide a display device having a built-in touch input unit in which the touch input unit is designed to be incorporated in the display device, to thus manufacture the display device and a touch panel through a single manufacturing process.

It is another object of the present invention to provide a display device having a built-in touch input unit that is configured to detect a touch input without inflecting an upper substrate of the display device without causing an increase in thicknesses of the display device, to thereby solve lowering of durability and shortening a lifetime of the display device.

It is still another object of the present invention to provide a display device having a built-in touch input unit that hardly causes decline of a transmissivity and has an excellent yield rate although touch components are incorporated in the display device.

Technical Solution

To attain the above objects of the present invention, there is provided a display device having a built-in touch input unit, the display device comprising:

a lower substrate (20) in which a pixel portion (22) having pixels and pixel electrodes is arranged;

an upper substrate (30) that is arranged at a distance from the lower substrate (20);

a plurality of first signal lines (32) and second signal lines (34) that are arranged on the upper surface or lower surface of the upper substrate (30) and through which a position detection signal is input and output;

touch cells (60) that are formed in a plurality of areas that are formed by dividing an active area where touch is achieved on the upper surface or the lower surface of the upper substrate (30) into the plurality of the areas, each touch cell (60) comprising a conductive pad (50) that forms an electrostatic capacity between the touch input unit (90) and the conductive pad (50) when the touch input unit (90) having a bodily finger or an electrical property similar to the bodily finger gains access to the conductive pad (50) within a predetermined distance (d) in each divided area, and a 3-terminal style switching element (40) whose gate electrode is connected to the conductive pad (50) and that has respectively different output signals according to electric potential of the conductive pad (50); and a touch position detecting portion (70) that transmits and receives position detection signals to and from the first signal lines (32) and the second signal lines (34), and detects whether output signals of switching element (40) are changed by capacitance that is formed between the touch input unit (90) and the conductive pad (50) when a touch input of the touch input unit (90) occurs, to thereby acquire a coordinate signal of the touch cell (60) on which the touch input has occurred.

Preferably but not necessarily, according to an embodiment of the present invention, the display device is one of LCD (Liquid Crystal Display), PDP (Plasma Display Panel), OLED (Organic Light Emitting Diode), and AMOLED (Active Matrix Organic Light Emitting Diode).

Preferably but not necessarily, according to another embodiment of the present invention, the lower substrate (20) is a TFT (Thin Film Transistor) substrate in which a TFT (Thin Film Transistor) is arranged by unit pixel, and both a gate line and a data line for applying an on/off control signal and a data signal are arranged in the TFT (Thin Film Transistor).

Preferably but not necessarily, according to still another embodiment of the present invention, the switching element (40) is a TFT (Thin Film Transistor).

Preferably but not necessarily, according to yet another embodiment of the present invention, a plurality of auxiliary signal lines (37) are further arranged on the upper surface or the lower surface of the upper substrate (30), and wherein the gate electrode of the switching element (40) of the touch cell (60) is connected to the first signal line (32), and the input electrode and the output electrode of the switching element (40) are connected to the auxiliary signal line (37) and the second signal line (34), respectively.

Preferably but not necessarily, according to yet still another embodiment of the present invention, a plurality of gate signal lines (36) and a plurality of auxiliary signal lines (37) are further arranged on the upper surface or lower surface of the upper substrate (30), wherein the switching element (40) of each touch cell (60) comprises: a first switching element (42) whose input electrode is connected to the first signal line (32), whose gate electrode is connected to the gate signal line (36) and whose output electrode is connected to the conductive pad (50); and a second switching element (44) whose gate electrode is connected to the conductive pad (50) and whose input electrode and output electrode are connected to the auxiliary signal line (37) and the second signal line (34), respectively, and wherein the touch position detecting portion (70) applies gate signals for turning on and off the first switching element (42) to the gate signal lines (36), respectively.

Preferably but not necessarily, according to a further embodiment of the present invention, a capacitor (54) is further connected between the output electrode of the first switching element (42) and the auxiliary signal line (37).

Preferably but not necessarily, according to a still further embodiment of the present invention, a first auxiliary signal line (37a) and a second auxiliary signal line (37b) are supplied individually separately as the auxiliary signal line (37) and the input electrode of the second switching element (44) and one end of the capacitor (54) are connected to respectively different auxiliary signal lines (37a and 37b).

Preferably but not necessarily, according to a yet further embodiment of the present invention, a plurality of sensing touch cells (61) are further formed for measurement of a reference signal to be compared with the position detection signal output to the second signal line (34) on the upper surface or the lower surface of the upper substrate (30).

Preferably but not necessarily, according to a still yet further embodiment of the present invention, each sensing touch cell (61) is formed in the same manner as that of the touch cell (60) with the conductive pad (50) removed.

Preferably but not necessarily, according to another further embodiment of the present invention, the sensing touch cells (61) are respectively installed in areas that is formed by dividing the upper substrate (30) into a plurality of the areas, and the reference signal measured from the sensing touch cells (61) within each area is used as the reference signal to be compared with the position detection signal of the corresponding area.

Preferably but not necessarily, according to another further embodiment of the present invention, a light shield layer to intercept light is formed on the upper portion of the switching element (40).

Preferably but not necessarily, according to still another further embodiment of the present invention, a transparent insulation film (55) that protects the touch cells (60) is coated on the upper surface or lower surface of the upper substrate (30).

Preferably but not necessarily, according to yet another further embodiment of the present invention, the touch position detecting portion (70) detects the position detection signal that is transmitted via the second signal line (34) on a digital basis.

Preferably but not necessarily, according to still yet another further embodiment of the present invention, the touch position detecting portion (70) intercepts the position detection signal or the on/off control signal from being applied to the touch cell (60) at which the touch position detection has been finished, to thereby reset the corresponding touch cell (60).

Preferably but not necessarily, according to another further embodiment of the present invention, the touch position detecting portion (70) further comprises a memory unit (74) that has addresses corresponding to coordinate values of the touch cells (60), and stores the coordinate value of the corresponding touch cell 60 in the corresponding address of the memory unit (74) if the position detection signal has been received from the second signal line (34).

Preferably but not necessarily, according to still another further embodiment of the present invention, unit pixels are arranged in a matrix form on the lower substrate 20, and the touch cells (60) of the upper substrate (30) are arranged in a resolution having a real number of times in comparison with the unit pixels.

Preferably but not necessarily, according to yet another further embodiment of the present invention, at least one or more signal lines among the signal lines that are arranged on the upper substrate (30) for detecting touch inputs are arranged on the same vertical line as that of at least one signal line among the signal lines that are arranged on the lower substrate (20) for display.

Preferably but not necessarily, according to still yet another further embodiment of the present invention, at least one or more signal lines among the signal lines that are arranged on the upper substrate (30) for detecting touch inputs are arranged along an oblique line with respect to at least one signal line among the signal lines that are arranged on the lower substrate (20) for display.

Advantageous Effects

As described above, a display device having a built-in touch input unit according to the present invention is configured to have touch components that can detect a non-contact touch input on an upper substrate among two substrates forming the display device, to thus detect a touch input using virtual capacitance formed between a conductive pad and a touch input unit that form a touch cell.

In this invention, thickness of the display device hardly increases, and the display device can be manufactured together with a touch panel in a single manufacturing process.

In addition, since touch components that are mounted on the upper substrate are formed similarly to a TFT (Thin Film Transistor) manufacturing process for TFTs on the lower substrate, the manufacturing process of the lower substrate, that is, the TFT substrate whose reliability and mass-productivity have been already verified can be partially employed, to thereby simplify the manufacturing process of the display device and greatly reduce a manufacture cost of the display device.

In addition, components for display are concentrically on the lower substrate, and components for detection of touch inputs are concentrically on the upper substrate, to thereby simplify a multi-layer structure of signal lines, obtain very excellent transmissivity, heighten the degree of freedom in design, and expect improvement of a yield of products.

In addition, touch inputs can be detected without bends of substrates, to thereby safely protect a liquid crystal or organic material that are sealed within two substrates for display, promote durability, and hardly shorten a lifetime in spite of internally mounting of a touch input unit.

In addition, this invention is configured to have two or more switching elements installed in each of touch cells, to thereby obtain effects of preventing mutual interference between signals and recognizing a multi-touch operation more stably.

In addition, a capacitor of proper capacity is added in each touch cell of the display device according to this invention, to thereby provide an effect of control an output waveform descending slope of a capacitive type touch cell due to a charge sharing effect between added capacitors and virtual capacitors.

In addition, sensing touch cells that generate reference signals when detecting touch inputs are installed in the display device according to the present invention, to thereby reduce errors of measurement of compensation and touch signals due to a temperature change and heighten a signal detection accuracy.

In addition, sensing touch cells are installed in a plurality of areas that are divided in this invention, respectively, and the signal that is received in the sensing touch cell is used as a reference signal of the corresponding area, to thereby provide an effect of minimizing an error of measurement that is caused by the wiring resistance of the signal line.

In addition, a light shield layer is formed on the upper portion of the switching element in the display device according to the present invention, to thereby provide an effect of preventing the switching element from malfunctioning in response to the external light.

In addition, a transparent insulation film that protects touch cells is formed in the display device according to the present invention, to thereby provide effects of preventing components of conductive pad, etc. from being damaged, and making it easy to secure a stable interval for forming capacitance between the touch input unit and the conductive pad.

In addition, a position detection signal that is received via the second signal line is detected on a digital basis in the display device according to the present invention, to thereby provide effects of enabling a fast signal processing, slimming the display device and reducing a manufacture cost, because of not requiring for any components such as an amplifier or signal converter.

In addition, the display device according to the present invention temporarily stores a position detection signal in a memory unit and thus calls the position detection signal stored in the memory unit and processes a touch operation in the case that the position detection signal that is received on a real-time basis is not recognized because of a lot of signal throughputs in a CPU (Central Processing Unit), to thereby preventing a loss of the signal.

In addition, the "signal lines for detecting touch inputs" that are arranged on the upper substrate are arranged on the same vertical line as that of the "signal lines for display" that are arranged on the lower substrate, to thereby provide an effect of preventing a moire phenomenon due to an interference between signals for display and signals for detection of touch inputs.

In addition, the "signal lines for detecting touch inputs" that are arranged on the upper substrate are arranged along an oblique line with respect to the "signal lines for display" that are arranged on the lower substrate, to thereby provide an effect of preventing a moire phenomenon due to an interference between signals for display and signals for detection of touch inputs.

DESCRIPTION OF DRAWINGS

The above and other objects and advantages of the invention will become more apparent by describing the preferred embodiments with reference to the accompanying drawings in which.

BEST MODE

Figure 1:
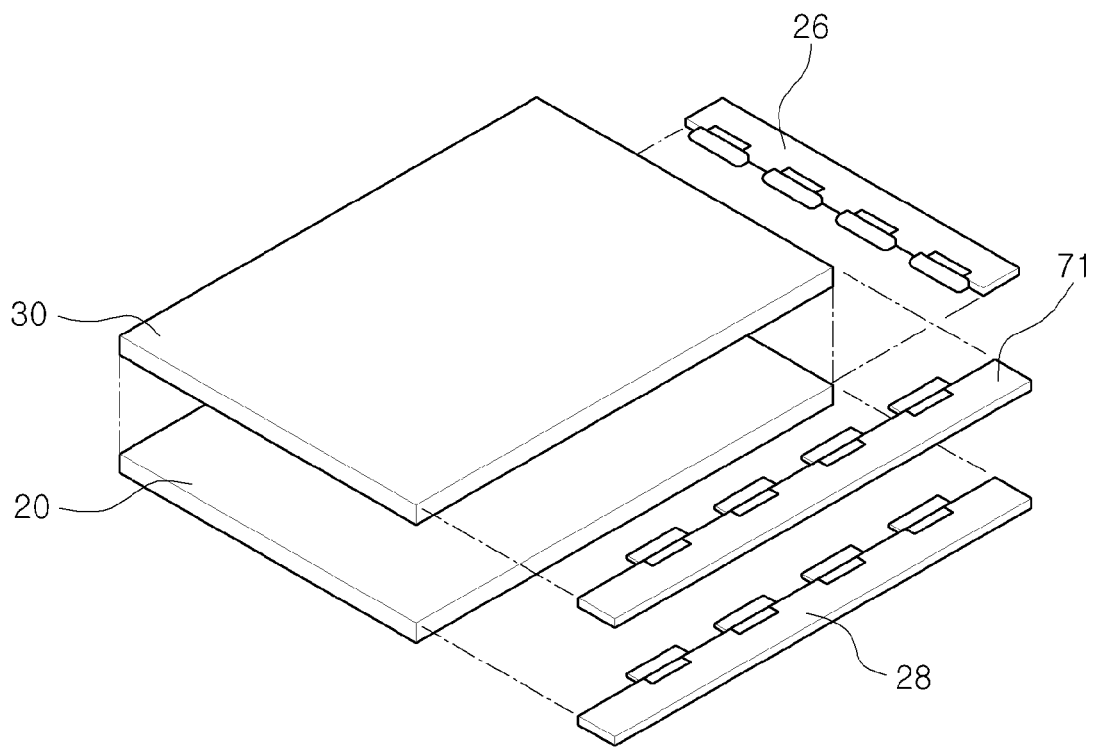
FIG. 1 is a disassembled perspective view showing an external structure of a display device according to this invention.

Hereinbelow, a display device having a built-in touch input unit according to preferred embodiments of the present invention will be described with reference to the accompanying drawings.

In the following drawings, thickness or areas have been expanded and shown in order to definitely express several layers and areas. Through the whole detailed description of the specification, like reference numerals are used for like elements. When it is mentioned that a portion such as a layer, an area and a substrate is placed "on" or "on the upper surface" of another portion, this means that the portion is not only placed "justly on" the other portion but also the former is placed on a third portion between the former and the latter. In contrary, when it is mentioned that a certain portion is placed "justly on" another portion, this means that there are no other portions between them.

In addition, in the following description, signal lines that are basically installed in a display device (fox example, gate lines and data lines in the case of LCD or AMOLED) are called "signal lines for display." Additional signal lines (fox example, such as first signal lines and second signal lines) for detecting touch inputs according to an embodiment of the present invention are called "signal lines for detection of touch inputs." If it is referred to only as "signal lines," it can be understood that the "signal lines" indicate signal lines for display and signal lines for detection of touch inputs.

In addition, in the following embodiments, switching elements can be explained as being replaced with "TFTs." Accordingly, identical reference numerals are used for the switching elements and TFTs.

First, the display device according to the present invention is one of LCD (Liquid Crystal Display), PDP (Plasma Display Panel), OLED (Organic Light Emitting Diode), and AMOLED (Active Matrix Organic Light Emitting Diode), and a display device having a built-in touch input unit.

Since a general composition of a display device that is applied in the present invention is the same as those of conventionally known display devices, components that are obvious to one of ordinary skill in the art will not be described below in detail.

Components that constitute a touch input unit in this invention are installed on an upper substrate of a display device according to the present invention. Touch cells each formed of a 3-terminal style switching element such as a TFT (Thin Film Transistor) and a conductive pad are formed on a signal substrate, in the touch input unit of this invention, unlike a conventional touch input unit that acquires a touch signal when two substrates are bent by a touch pressure and come in contact with each other. Accordingly, the present invention detects a charge accumulated in a virtual capacitor formed between the touch input unit and the conductive pad in various forms and acquires a touch signal, when the touch input unit such as a part of the human body such as a finger, an iron pen, an electron pen that generates a predetermined electrical signal, or the like approaches the conductive pad in a non-contact manner. As an embodiment of the present invention, a switching element is turned on/off by virtual capacitance which is formed between the touch input unit and the conductive pad to thus acquire a touch signal. Although it will not be referred to as an embodiment of the present invention, an on/off control signal for turning on/off the switching element is separately applied to the switching element, to thus detect a charge that has been accumulated in the virtual capacitor which is formed between the touch input unit and the conductive pad and acquire a touch signal.

Here, as the touch components that are arranged on the upper substrate, touch cells each including a TFT (Thin Film Transistor) and a conductive pad are arranged in a matrix form. This is similar to the lower substrate of the display device, that is, a TFT substrate, in view of a design pattern. That is, the manufacturing process of the lower substrate, that is, the TFT substrate whose reliability and mass-productivity have been already verified can be partially employed in a manufacturing process of installing touch components on the upper substrate. Therefore, a stabler manufacturing process and product reliability can be expected when a touch input unit is internally installed in the display device. Of course, components for display such as TFTs and pixel electrodes that are installed in the lower substrate of the display device and components for detecting touch inputs such as TFTs and conductive pads are similar to each other only in view of external appearance, but differ from each other in view of functions and actions.

In this invention, touch cells that are formed on the upper or lower surface of the upper substrate are formed in a plurality of areas that are formed by dividing an active area where touch inputs are achieved into the plurality of the areas. Each touch cell includes a 3-terminal style switching element and a conductive pad that is connected to any one of three terminals of the switching element in each divided area. The other two terminals of the switching element are connected to signal lines for detection of touch inputs, respectively. A touch position detecting portion transmits and receives a position detection signal to and from signal lines for detection of touch inputs. In addition, the touch position detecting portion detects electric voltage or electric current of signals that are received from the signal lines according to an turn-on or turn-off state of the switching element when a virtual capacitor is formed between the touch input unit and the conductive pad, to thereby acquire a touch signal. Fox example, the touch position detecting portion can detect whether size or flow time of electric current is changed by an electrostatic capacity between the touch input unit and the conductive pad, on an analog basis. Preferably, the touch position detecting portion can detect whether an electric voltage or current signal output from the switching element is at a high/low level on a digital basis. On the following description, the digital detection mode of the latter will be described below.

The display device according to this invention is provided in various kinds of embodiments. As an example, a conductive pad is connected to a source electrode (hereinbelow, referred to as an "input electrode") of a switching element or a drain electrode (hereinbelow, referred to as an "output electrode" of the switching element in each touch cell, and a gate signal that is an on/off control signal is applied to a gate electrode of the switching element. As an alternative example, a conductive pad is connected to a gate electrode of a switching element in each touch cell, and an input electrode and an output electrode of the switching element is connected to signal lines through which position detection signals are transmitted and received, respectively. The display device according to this invention can be embodied in various embodiments as described above, but the following embodiment of the present invention will be described below, with respect to the latter embodiment, that is, the embodiment that the conductive pad is connected to the gate electrode of the switching element.

FIG. 1 is a disassembled perspective view showing an external structure of a display device according to this invention and shows a general composition of the display device. Referring to FIG. 1, a display device according to this invention includes two substrates largely like a general display device. In the case of a LCD (Liquid Crystal Display), a lower substrate 20 is a TFT (Thin Film Transistor) substrate on the upper surface of which pixels and pixel electrodes are arranged, TFTs are respectively arranged in a unit pixel, and gate lines and data lines are arranged. An upper substrate 30 is a color filter substrate on which color filters are printed. A liquid crystal layer in which liquid crystal is sealed is formed between the lower substrate 20 and the upper substrate 30. In the case of a AMOLED (Active Matrix Organic Light Emitting Diode), a lower substrate 20 is a TFT substrate that is formed similarly to the LCD, and an upper substrate 30 is a sealed substrate for sealing organic matters. The lower substrate 20 and the upper substrate 30 are formed of a light transmittance material such as glass, plastic or film. The lower substrate 20 and the upper substrate 30 can be formed of a substrate having a multi-layer structure that is not a single substrate. For example, the upper substrate 30 can be configured by mounting touch components including touch cells 60 on a film, and uniting this film with a glass or plastic substrate.

As illustrated, a gate integrated circuit (IC) 26 and a source integrated circuit (IC) 28 are mounted at an edge portion of the lower substrate 20. The gate IC 26 applies a gate signal to a TFT that is installed by unit pixel, and the source IC 28 applies a data signal to each TFT. The gate IC 26 and the source IC 28 are a drive IC for controlling signals for display, respectively, and are mounted at the edge portion of the lower substrate 20 in the form of COF (Chip On Film) or COG (Chip On Glass).

The composition of the display device according to the present invention that is configured as described above is equal to that of a general composition of a conventional display device. Here, as illustrated, the display device according to this invention further includes a touch signal drive integrated circuit (IC) 71 in order to control signals for detection of touch inputs. As illustrated, the touch signal drive IC 71 is mounted at the edge portion of the upper substrate 30 in the form of COF (Chip On Film) or COG (Chip On Glass). Of course, the touch signal drive IC 71 can be installed at the edge portion of the lower substrate 20 or integrated with the gate IC 26 or the source IC 28 of lower substrate 20. In this case, the touch signal drive IC 71 of the lower substrate 20 is connected to the upper substrate 30, using a signal transfer medium such as a FPC (Flexible Printed Circuit).

Figure 2:
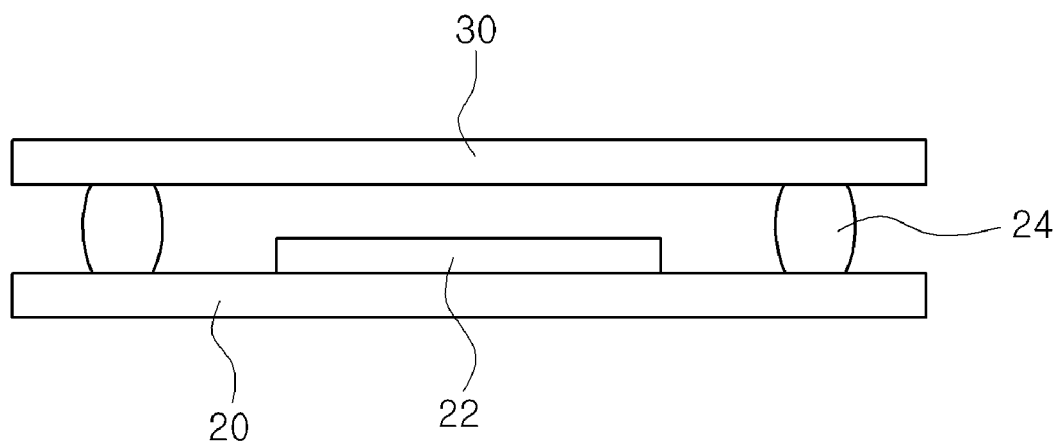
FIG. 2 is a cross-sectional view for conceptually showing an example of an AMOLED (Active Matrix Organic Light Emitting Diode)

FIG. 2 shows an example that an embodiment of this invention is applied in an active matrix organic light emitting diode (AMOLED). In the case of the AMOLED, a lower substrate 20 is a TFT substrate, and pixels and pixel electrodes are arranged on the upper surface of the TFT substrate, to thereby form a pixel portion 22. Meanwhile, the upper substrate 30 is a sealed substrate for sealing an organic material that is evaporated on the upper surface of the lower substrate 20. As shown, the lower substrate 20 and the upper substrate 30 are sealed by sealant 24. Although not shown, a plurality of unit pixels are arranged in a matrix type in the pixel portion 22. A TFT for switching of an image signal is installed in each unit pixel. A plurality of gate lines and data lines are insulated and crossed on the upper surface of the lower substrate 20, and a common power line is arranged to run parallel with the data lines. In this structure of AMOLED, touch components are installed on the upper substrate 30 that is a sealed substrate, like embodiments to be described later. Meanwhile, the AMOLED does not need any separate light source as it functions as a light emitting device, but the LCD needs a BLU (Back Light Unit) that is installed at the back of the lower substrate 20. In addition, this invention is not limited to be applied to the LCD or AMOLED, but is applicable to various kinds of display devices having a structure that at least two substrates are arranged at a distance from each other.

Figure 3:
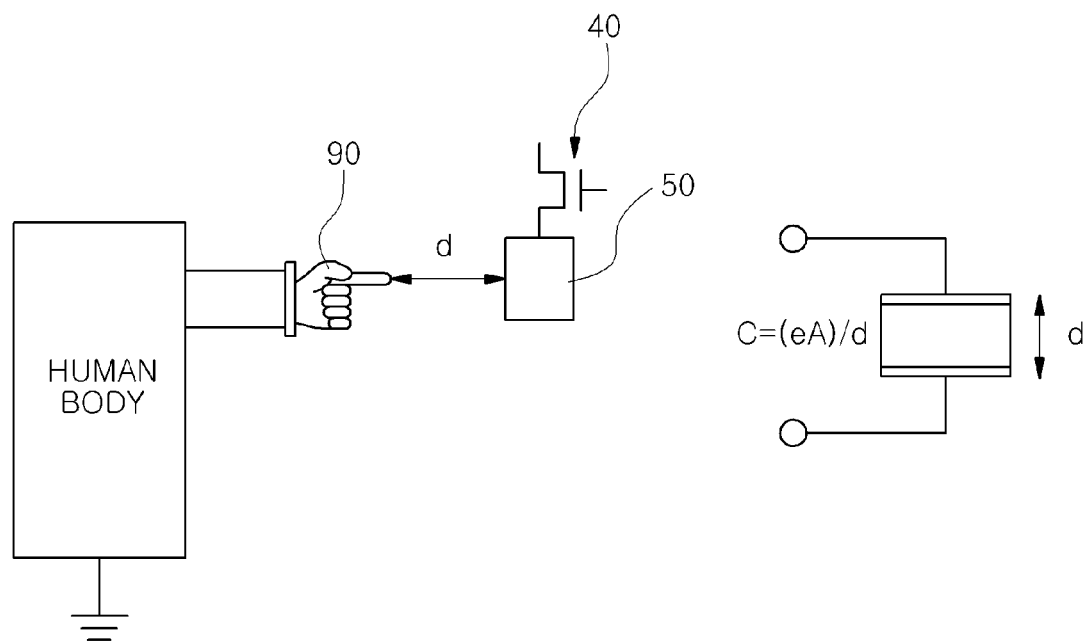
FIG. 3 is a diagram for conceptually explaining an electrostatic capacity formation example between the human body and a conductive pad.

Before explaining about a specific embodiment of this invention, a principle of detecting a non-contact touch input according to this invention will be briefly explained below. FIG. 3 shows an example that a capacitor is formed between a conductive pad and a human body when a finger approaches to the conductive pad in this invention. The touch input unit 90 is a bodily finger in FIG. 3. Referring to FIG. 3, assuming that a distance between the finger and the conductive pad 50 is an interval "d" and corresponds to an area "A", when a finger approaches to the conductive pad 50, an electrostatic capacity "C" is formed between the finger and the conductive pad 50 as shown in a right side equivalent circuit of FIG. 3 and a numerical formula, that is, $C=(eA)/d$. In this case, the earth acts as a virtual ground with respect to the human body. Therefore, charges can be accumulated in the electrostatic capacity "C" formed between the finger and the conductive pad 50 if voltage is applied to the conductive pad 50. Hereinbelow, the electrostatic capacity "C" is expressed as the virtual capacitor.

As an embodiment, when the human body contacts the conductive pad 50, the electrostatic capacity of 10-20 pF is formed, and the electrostatic capacity of 2-5 pF can be formed according to permittivity "e" of an object between the human body and the conductive pad 50 in the case that the human body approaches to the conductive pad 50 at a non-contact state. This embodiment recognizes a touch action that the touch input unit 90 having a conduction property of the human body or the like lightly contacts or approaches to the conductive pad 50, using the electrostatic capacity characteristic formed between the conductive pad 50 and the human body.

Figure 4:
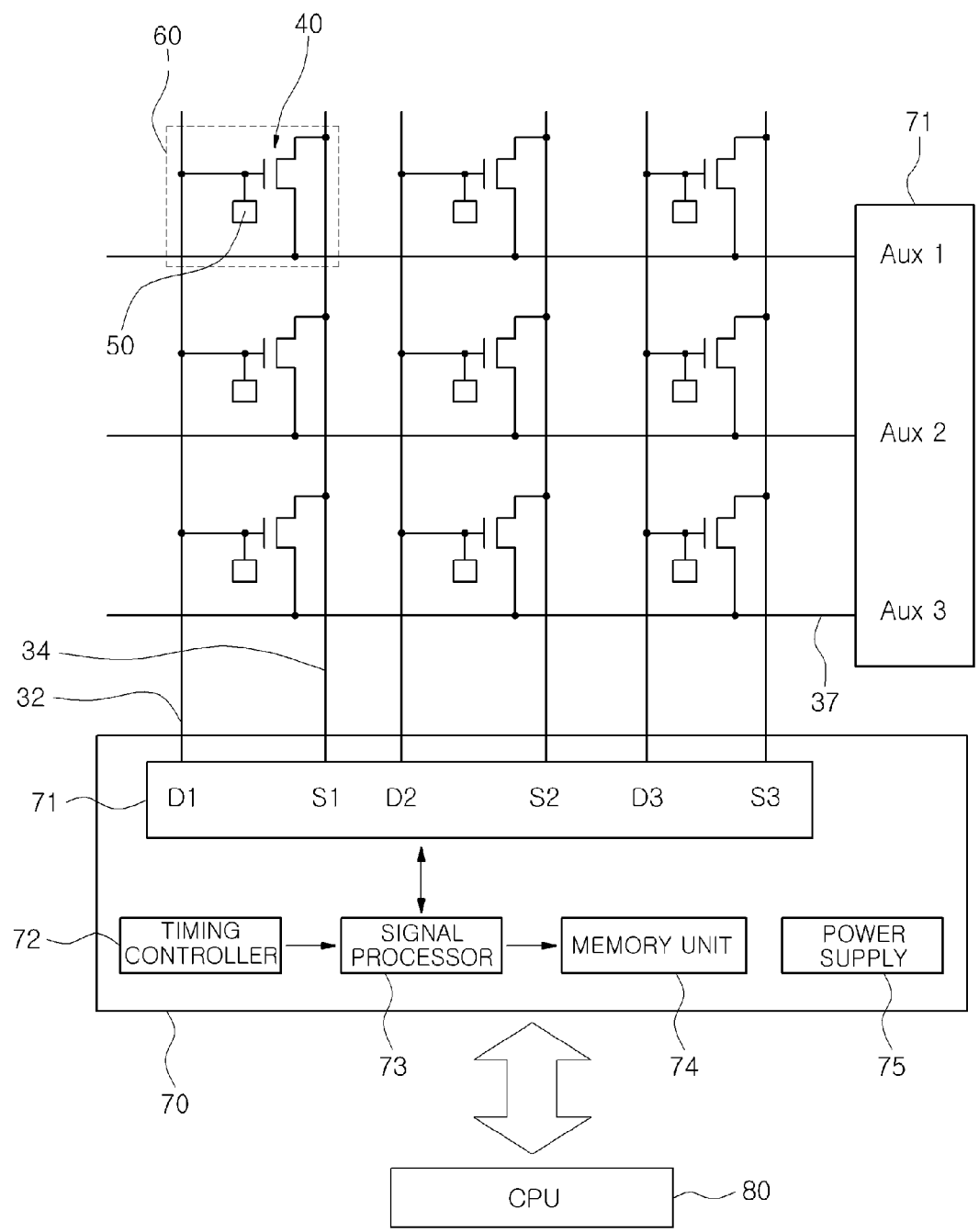
FIG. 4 is a configurational diagram showing an embodiment of an upper substrate according to the present invention.

In the embodiment of this invention, a certain distance should be kept between the conductive pad 50 and the human body. That is, because the touch input unit 90 and the conductive pad 50 are at a non-contact state, a terminology "approach" has been used for the touch input unit 90 and the conductive pad 50. If a touch cell 60 of FIG. 4 is installed on the lower surface of the upper substrate 30, the touch input unit 90 maintains a state of being spaced from the conductive pad 50 in the case that the touch input unit 90 contacts the upper surface of the upper substrate 30. In this case, the touch input unit 90 is spaced from the conductive pad 50 but comes in contact with the upper substrate 30. Accordingly, a terminology "contact" has been also used. The terminologies "contact" and "approach" are used as the above-described meanings in this specification.

Figure 5:
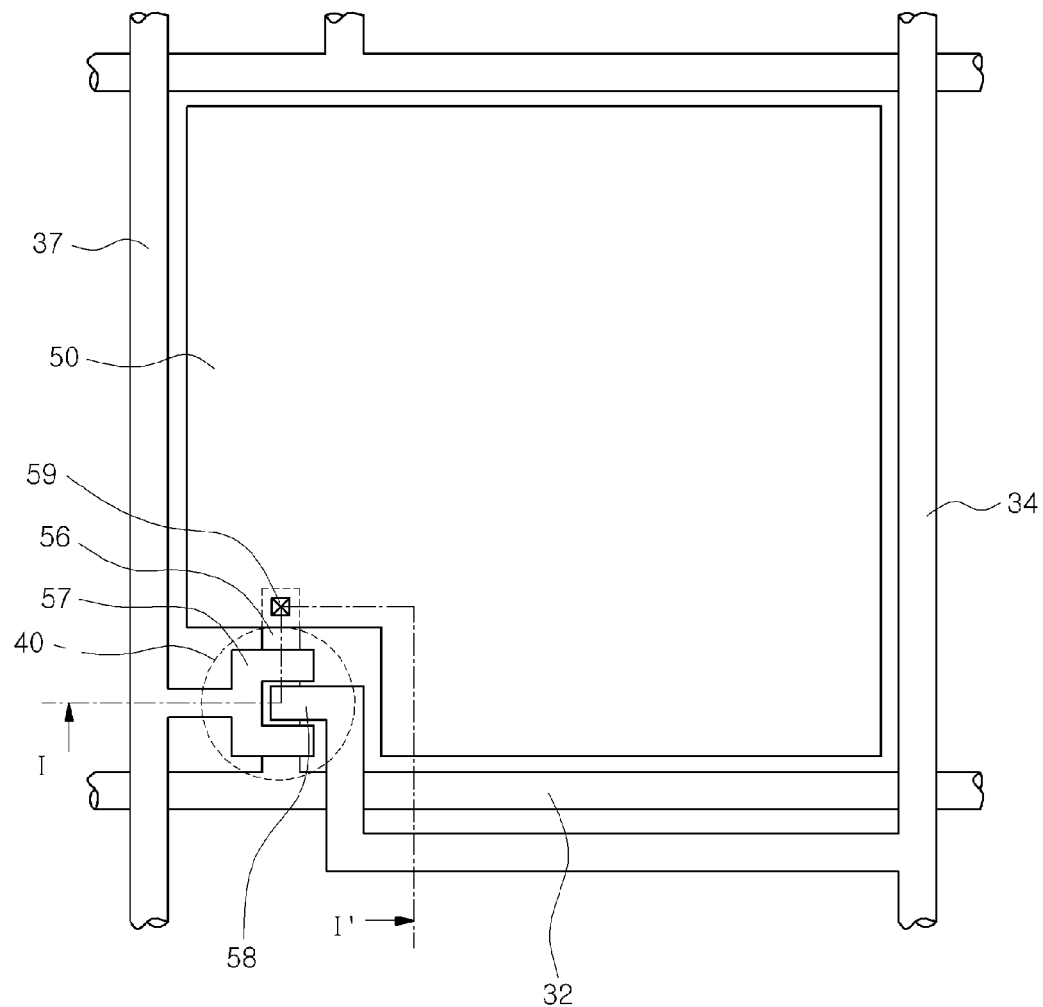
FIG. 5 is a plan view showing a configurational example of a unit touch cell in the FIG. 4 embodiment.
Figure 6:
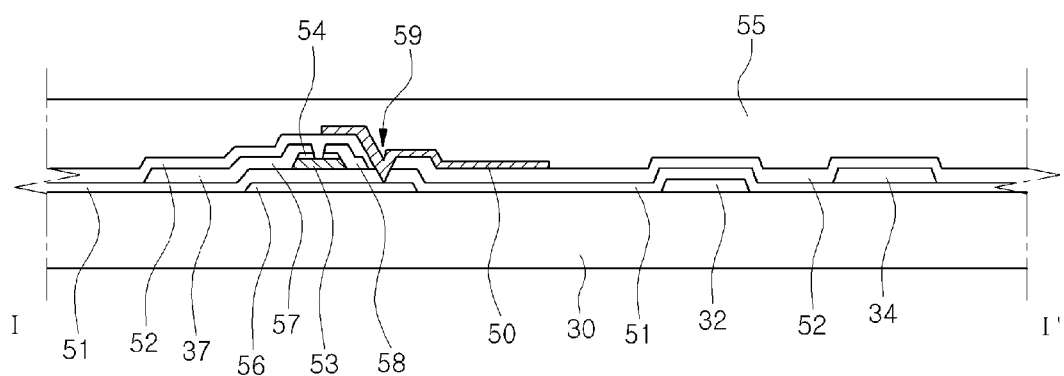
FIG. 6 is a cross-sectional view cut along a line I-I' of FIG. 5.

FIG. 4 is a configurational diagram showing an embodiment that touch components are installed on an upper substrate according to the present invention. FIG. 5 is a plan view showing a configurational example of a unit touch cell in the FIG. 4 embodiment. FIG. 6 is a cross-sectional view cut along a line I-I' of FIG. 5. Referring to these drawings, the embodiment that touch components are installed on an upper substrate according to the present invention will be described below.

Referring to FIG. 4, a plurality of first signal lines 32, second signal lines 34 and auxiliary signal lines 37 are arranged on the upper or lower surface of the upper substrate 30. The first signal lines 32 are lines to send position detection signals, and the second signal lines 34 are lines to receive the position detection signals. The auxiliary signal lines 37 are lines to apply auxiliary signals for observing position detection signals. A touch signal drive IC 71 transmits and receives the position detection signals to and from the signal lines 32, 34, and 37, respectively, and applies the auxiliary signal for observation. In the illustrated embodiment, the first signal lines 32 and the second signal lines 34 are arranged in parallel with each other, and the auxiliary signal lines 37 are arranged crossing two signal lines 32 and 34. However, these signal lines have been illustrated only to help comprehension of this invention in FIG. 4, but the first signal lines 32 and the second signal lines 34 can be changed crossing each other. In addition, each signal line has been wired in the vertical or horizontal direction in the illustrated embodiment, but as will be described later, each signal line can be wired in an oblique direction in the form of a zigzag pattern.

Referring to the circuit composition of FIG. 4 and the plane composition of FIG. 5, unit touch cells 60 each includes a 3-terminal style switching element 40 and a conductive pad 50. The 3-terminal style switching element 40 is a TFT desirably. The TFT 40 that forms a touch cell 60 is installed on the upper substrate 30, and differs from a TFT for video signal switching that is installed on the lower substrate 20. Since the touch cell 60 includes the TFT 40, it is easy to control the TFT to be turned on/off by applying a gate signal to the gate electrode of the TFT, and it is advantageous that flowing and interference of signals can be intercepted stably. In addition, signals in each touch cell 60 are divided or partitioned, using this advantage, to thereby enable a multi-touch operation to be recognized. In addition, the TFT 40 is advantageous in view of components verified in the LCD or AMOLED.

Referring to FIG. 4, the gate electrode of the TFT 40 is connected to the first signal line 32 in each touch cell 60, and the input electrode and the output electrode of the TFT 40 are connected to the auxiliary signal line 37 and the second signal line 34, respectively. Meanwhile, the conductive pad 50 is connected to the gate electrode of the TFT 40.

Referring to the plan view of FIG. 5, a configurational example of the unit touch cell 60 can be seen in more detail. As illustrated, a connection relationship among the TFT 40, the signal lines and the conductive pad 50 follows in each unit touch cell 60. The gate electrode 56 of the TFT 40 withdrawn from the first signal line 32 is connected to the conductive pad 50. The source electrode 57 of the TFT 40 is connected to the auxiliary signal line 37, and the drain electrode 58 thereof is connected to the second signal line 34. Contact holes 59 of a contact process that uses ITO (Indium Tin Oxide) are used at portions where terminals, signal lines, conductive pads, etc., of a layer are mutually connected with other layers.

Here, the conductive pad 50 is formed by coating a transparent conductive material such as ITO (Indium Tin Oxide), IZO (Indium Zinc Oxide), ATO (Antimony Tin Oxide), CNT (Carbon Nano Tube) on one surface of the upper substrate 30. The conductive pad 50 can be installed only in a local area of the touch cell 60, but as illustrated in FIG. 5, the conductive pad 50 is installed in the touch cell 60 so as to have as possible as a wide area. As the area of the conductive pad 50 becomes large, virtual capacitance formed between the touch input unit 90 and the conductive pad 50 becomes large to thus acquire a touch signal stably.

The cross-sectional view of FIG. 6 is a cross-section that is formed by partially cutting the plane composition of FIG. 5, and shows a layer structure in the unit touch cell 60. Although the touch components can be installed on the upper or lower surface of the upper substrate 30, the cross-sectional view of FIG. 6 shows an example that the touch components are installed on the upper surface of the upper substrate 30.

Referring to FIG. 6, the gate electrode 56 of the TFT 40 is formed on the same metal layer as that of the first signal line 32, the source electrode 57 thereof is formed in the same metal layer as that of auxiliary signal line 37, and the drain electrode 58 thereof is formed in the same metal layer as that of the second signal line 34. As illustrated, the gate electrode 56 is installed in the TFT 40. The TFT 40 includes an active layer 53 that forms a channel between the source electrode 57 and the drain electrode 58. The active layer 53 is formed to overlap the source electrode 57 and the drain electrode 58. An ohmic contact layer 54 for ohmic contact between the source electrode 57 and the drain electrode 58 is further formed on the active layer 57. The active layer 57 is formed of amorphous silicon (A-si) or poly-silicon (P-Si).

A gate insulator film 51 is formed on the upper surface of the gate electrode 56, and a passivation film 52 is formed on the upper surface of the source electrode 57 and the drain electrode 58, respectively. As illustrated, in order to connect the conductive pad 50 on the gate electrode 56 of the TFT 40, the contact hole 59 using ITO etc., is used.

As illustrated, in the case that the touch components are installed on the upper surface of the upper substrate 30, a transparent insulation film 55 is coated on the upper surface of the upper substrate 30, to thereby protect the touch components. The transparent insulation film 55 prevents the touch components from being exposed and thus damaged, and simultaneously plays a role of keeping a stabilized interval between the touch input unit 90 and the conductive pad 50. Also, use of the transparent insulation film 55 enables an interval between the touch input unit 90 and the conductive pad 50 to be kept narrow. Accordingly, a distance variable of the denominator in the numerical formula, that is, $C=(eA)/d$ becomes small, when virtual capacitance is formed by approaching of the touch input unit 90, and the virtual capacitance becomes large.

If the touch components are installed on the lower surface of the upper substrate 30, the transparent insulation film 55 can be removed. This is because the touch components are safely protected by the upper substrate 30, and because the touch input unit 90 and the conductive pad 50 can keep a stabilized interval by thickness of the upper substrate 30. In this case, there are advantages of simplifying a manufacturing process more and heightening transmissivity since no transparent insulation film 55 is used.

Meanwhile, although not illustrated, a light shield layer to intercept light can be installed on the upper surface of the TFT 40. The light shield layer can be formed of metal used in manufacturing the source electrode 57 or drain electrode 58 of the TFT 40, metal used in manufacturing the gate electrode 56, or an impermeable insulation film. The impermeable insulation film can be formed of an oxide film or nitride film or an insulation poly-silicon film. This light shield layer prevents the TFT 40 from reacting the light and malfunctioning.

In addition, the light shield layer formed of the impermeable insulation film can be formed on the upper or lower surface of the first signal lines 32, the second signal lines 34, the auxiliary signal lines 37 or the other signal lines to be described later. The light shield layer formed on the upper surface of the TFT 40 and the light shield layer formed on the upper surface of the signal lines 32, 34, and 37 are formed in an identical mask and formed all at once in an equal manufacturing process. The light shield layer for the signal lines 32, 34, and 37 can solve problems of deteriorating visibility caused by reflecting light from the signal lines to thus induce a flash and deteriorating a contrast of the display device.

The passivation film can be formed again on the upper portion of the light shield layer. The passivation film is a nitride layer or glass (PSG) layer formed on the outside layer of the light shield layer, and is formed chiefly for the purpose of increasing a physical strength, and enhancing tolerance and insulation property for outside moisture or temperature.

In the display device according to this invention, the touch cells 60 installed on the upper substrate 30 can be arranged in a matrix pattern similarly to that of the pixel portion 22 installed on the lower substrate 20. According to the matrix arrangement structure, the touch cells 60 can be designed with a rule similar to that of the unit pixel of the pixel portion 22, which brings a lot of technological advantages.

As the preferred embodiment of the present invention, the touch cells 60 are arranged in a resolution having a real number of times in comparison with the unit pixels that are installed on the lower substrate 20. As described above, if resolution of the touch cells 60 has a real number of times as high as that of the unit pixels, the signal lines of the lower substrate 20 and those of the upper substrate 30 are arranged regularly, to thus avoid a moire phenomenon that causes light interference between the upper and lower signals. Therefore, a display quality of the display device is not lowered even if the signal lines for detection of touch inputs are arranged on the upper substrate 30.

In addition, the signal lines that are arranged on the upper substrate 30 for detection of touch inputs can be arranged on the same vertical line as those that are arranged on the lower substrate 20 for display. This arrangement of the signal lines prevents transmissivity of a panel from lowering to thus enhance a display quality of the display device, and prevents a moire phenomenon of causing wave patterns to appear by an interference between signals for display and those for detection of touch inputs.

Figure 7:
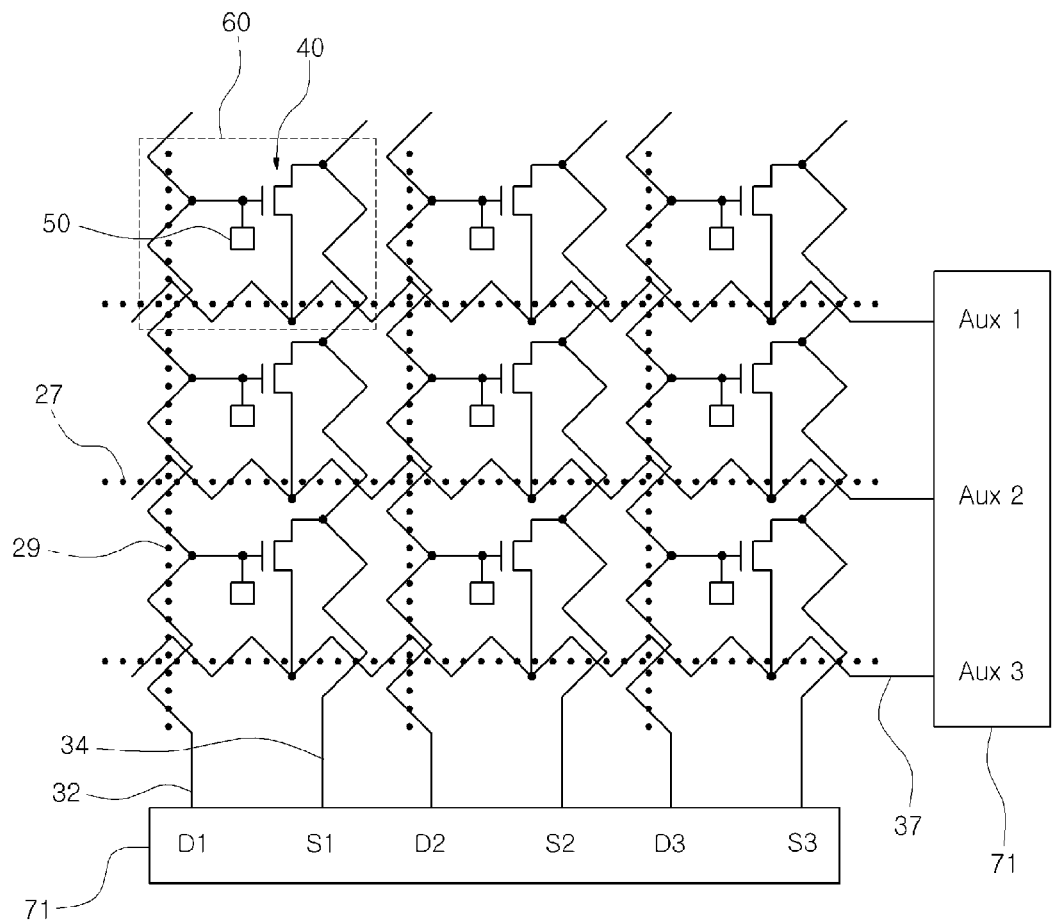
FIG. 7 is a configurational diagram showing a wiring example of signal lines to remove a moire phenomenon.

An embodiment of FIG. 7 provides an alternative way that prevents a moire phenomenon. Referring to FIG. 7, signal lines indicated by dots in the horizontal and vertical directions, and are gate lines 27 and data lines 29 that are arranged on the upper surface of the lower substrate 20. The signal lines for detection of touch inputs are arranged in an oblique direction on the upper substrate 30 are arranged with respect to the gate lines 27 and the data lines 29. Although the first signal lines 32, the second signal lines 34 and the auxiliary signal lines 37 have been arranged in an oblique direction in the form of a zigzag pattern with respect to the signal lines for display of the lower substrate 20, but it is apparent that the additional signal lines for detection of touch inputs to be described later can be also arranged in an oblique direction with respect to the signal lines for display. In addition, only one signal line among the signal lines for detection of touch inputs can be also arranged in an oblique direction. In addition, the signal lines for display of the lower substrate 20 can be arranged in an oblique direction in the form of a zigzag pattern, and the signal lines for detection of touch inputs of the upper substrate 30 can be arranged in a straight line direction.

As described above, if the signal lines for detection of touch inputs are arranged in an oblique direction with respect to the signal lines for display, the signal lines at both sides thereof are arranged in a direction crossing each other. Therefore, since the respective signal lines arranged on the lower substrate 20 and the upper substrate 30 overlap each other, it can be prevented that a moire phenomenon happens by light interference between the signal lines toward an identical direction.

Referring back to FIG. 4, it can be seen that the touch cells 60 are illustrated in a resolution of 3×3. Actually, although the touch cells 60 will be arranged in a very high resolution, a reason why that the touch cells 60 have been arranged in a resolution of 3×3 in FIG. 4 is nothing but an example that is supposed and illustrated to help comprehension of this invention. The embodiments to be described later will be also described by instances that the touch cells 60 are arranged in a resolution of 3×3.

FIG. 4 illustrates a system configuration of a touch input unit with a circuit composition of touch cells 60. Referring to FIG. 4, a touch position detecting portion 70 is installed at the edge portion of one side of the upper substrate 30 or at the outside thereof. As illustrated, the touch position detecting portion 70 includes a touch signal drive IC 71, a timing controller unit 72, a signal processor 73 and a memory unit 74. A touch signal that is acquired in the touch position detecting portion 70 is delivered to a CPU 80, and produces an input signal that corresponds to a corresponding coordinate.

The touch signal drive IC 71 applies a position detection signal to the first signal lines 32, and receives the position detection signal from the second signal lines 34. As described above, the touch signal drive IC 71 is mounted at the edge portion of one side of the upper substrate 30 or the lower substrate 20 in the form of a COG or COF pattern. In addition, the touch signal drive IC 71 can apply a gate signal and an auxiliary signal for observation even to gate signal lines 36 and auxiliary signal lines 37 to be referred in the embodiments to be described later.

The timing controller 72 generates a time sharing signal, and the signal processor 73 applies the position detection signal, the gate signal, and the auxiliary signal for observation that have been time shared to the touch signal drive IC 71 according to clock provided from the timing controller 72. The memory unit 74 is a unit for storing coordinate values of the touch cells 60 from which touch inputs are detected. An electric power supply 75 is a unit for creating high or low voltage of signals for detection of touch inputs.

By the way, in the case that the touch position detecting portion 70 is at a "busy" state in a process of processing a lot of signals, a case that do not recognize the position detection signal can occur. Since the position detection signal that has not been already recognized cannot be reproduced, this can cause a loss of signals. The touch position detecting portion 70 prevents the signal loss using the memory unit 74.

Figure 8:
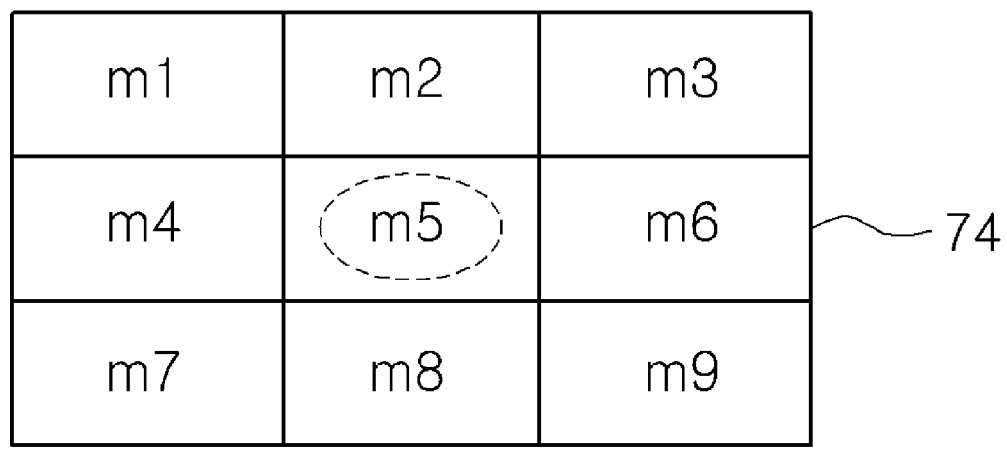
FIG. 8 is a block diagram showing an embodiment of a memory unit according to the present invention.

FIG. 8 is a block diagram illustrating the memory unit 74, and illustrates a composition of the memory unit 74, in the case that the touch cells 60 have a resolution of 3×3, as shown in FIG. 4. The memory unit 74 has absolute addresses m1-m9 that correspond to coordinate values of the touch cells 60. In this embodiment, the memory unit 74 has a capacity of at least 9 bits. If a touch input occurs in a touch cell 60 located at the central touch cell 60 among the touch cells 60 of FIG. 4, the position detection signal that is received by the touch position detecting portion 70 has a coordinate value of "D2, S2." In addition, the touch position detecting portion 70 stores a corresponding signal in an address of "M5" of the memory unit 74. The stored signals are called by the signal processor 73 to then be used. Fox example, the touch position detecting portion 70 scans the whole position detection signal that is applied to the first signal lines 32 one time, and then reads out the memory unit 74 in order to confirm whether or not there are omitted signals. If a resolution of the touch cells 60 is 1366×768, the memory unit 74 needs a capacity of at least 1049088 bits or more and should secure a capacity of about 132 kilobytes.

Figure 9:
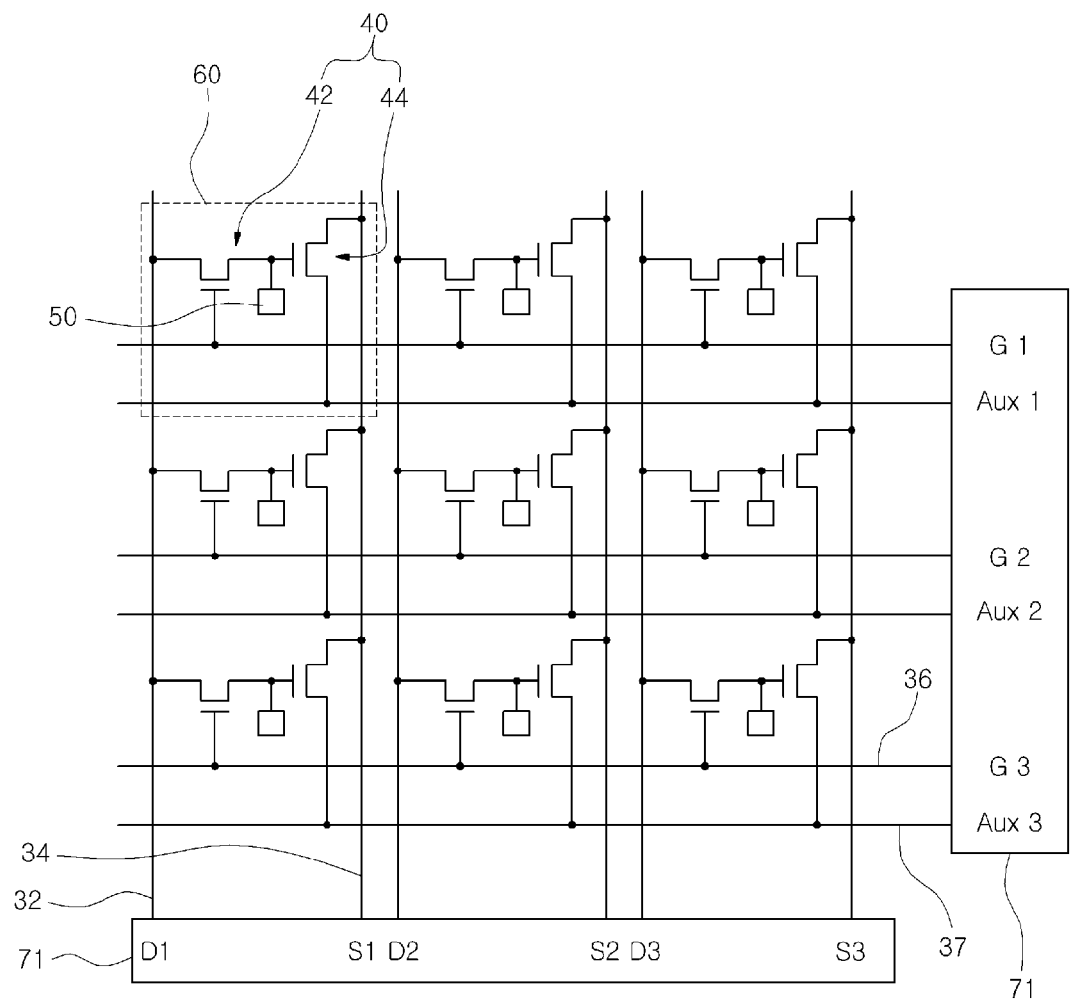
FIG. 9 is a configurational diagram showing another embodiment of an upper substrate according to the present invention.

Meanwhile, the embodiment of FIG. 4 is an excellent embodiment for explaining a basic operation of this invention, but has a problem of making it difficult to perform a multi-touch operation unless signals are specially processed. For example, if signals are applied to the first signal lines 32, all TFTs 40 connected to the first signal lines 32 operate. Accordingly, in the case that a plurality of touch inputs occur, it is difficult to confirm an absolute position with respect to each touch input. To solve this problem, an embodiment of FIG. 9 shows an example that two 3-terminal style switching elements 42 and 44 are installed in each touch cell 60 to thus process signals more stably and enable recognition of a multi-touch operation. Hereinafter, the first switching element 42 and the second switching element 44 are explained after being replaced with TFTs, respectively, using the same reference numerals and characters.

Referring to FIG. 9, the first signal lines 32, the second signal lines 34, the gate signal lines 36 and the auxiliary signal lines 37 are arranged on one surface of the upper substrate 30. In addition, a unit touch cell 60 includes a conductive pad 50 and first and second TFTs 42 and 44. The input electrode of the first TFT 42 is connected to the first signal line 32, and the gate electrode thereof is connected to the gate signal line 36. The output electrode of the first TFT 42 is connected to the gate electrode of the second TFT 46. The input electrode of the seconds TFT 46 is connected to the auxiliary signal line 37, and the output electrode thereof is connected to the second signal line 34. In addition, the conductive pad 50 is connected to the gate electrode of the second TFT 46.

The touch position detecting portion 70 sequentially applies a scan pulse to the gate signal lines 36, respectively and turns on the first TFTs 42 in sequence. Otherwise, the gate signal Gn (n=1, 2, 3) is made to be turned on to thus induce charging with the human body, and then auxiliary signals for observation are sequentially applied to the auxiliary signal lines 37, to thus detect a touch position.

The embodiment of FIG. 9 enables the first TFTs 42 to insulate signals between the conductive pads 50, to thereby enable a multi-touch operation.

Figure 10:
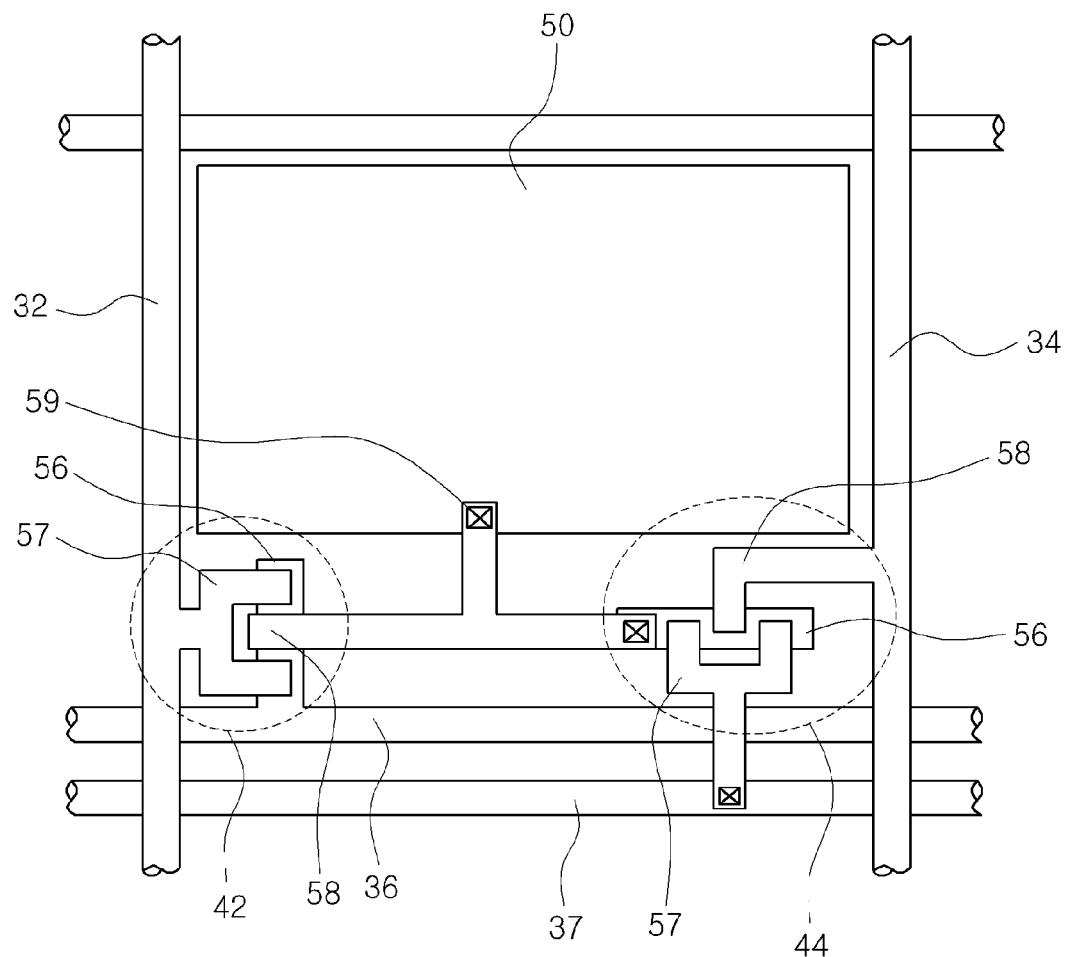
FIG. 10 is a plan view showing a configurational example of a unit touch cell in the FIG. 9 embodiment.

FIG. 10 is a plan view showing a configurational example of the unit touch cell 60 in the embodiment of FIG. 9. Referring to FIG. 10, the first signal lines 32 and the second signal lines 34 are arranged in the vertical direction with respect to the upper substrate 30, and the gate signal lines 36 and the auxiliary signal lines 37 are arranged in the horizontal direction. The conductive pad 50 is formed to secure a sufficient area in each touch cell 60, and the conductive pad 50 overlaps the signal lines 32 and 34 or can be formed in an extended area from the area that is partitioned by the signal lines 32 and 34.

The gate electrode 56 of the first TFT 42 is connected to the gate signal line 36, the source electrode 57 thereof is connected to the first signal 32 and the drain electrode 58 thereof is connected to the conductive pad 50. The gate electrode 56 of the second TFT 44 is connected on the drain electrode 58 of the first TFT 42, and the source electrode 57 thereof is connected to the auxiliary signal line 37 and the drain electrode 58 thereof is connected to the second signal line 34. Each signal line on the upper substrate 30 is formed of source metal or gate metal by stratum, and the respective electrodes of the TFTs 42 and 44 are formed of a multi-layer structure that gate metal, source metal, and amorphous silicon are insulated by an insulation layer. In order to connect the conductive pads 50 and the TFTs 40 with the signal lines, contact holes 59 of a contact process using ITO are used.

In the embodiment of FIGS. 9 and 10, two TFTs 42 and 44 are installed in each touch cell 60. Accordingly, although an output from the touch signal drive IC 71 and applied to the first signal line 32 is at a high impedance, a signal at the conductive pad 50 can be kept at a high impedance by the first TFT 42. Thus, the embodiment of FIGS. 9 and 10 makes it easy to process signals and provides a stabilized touch position detecting method.

Figure 11:
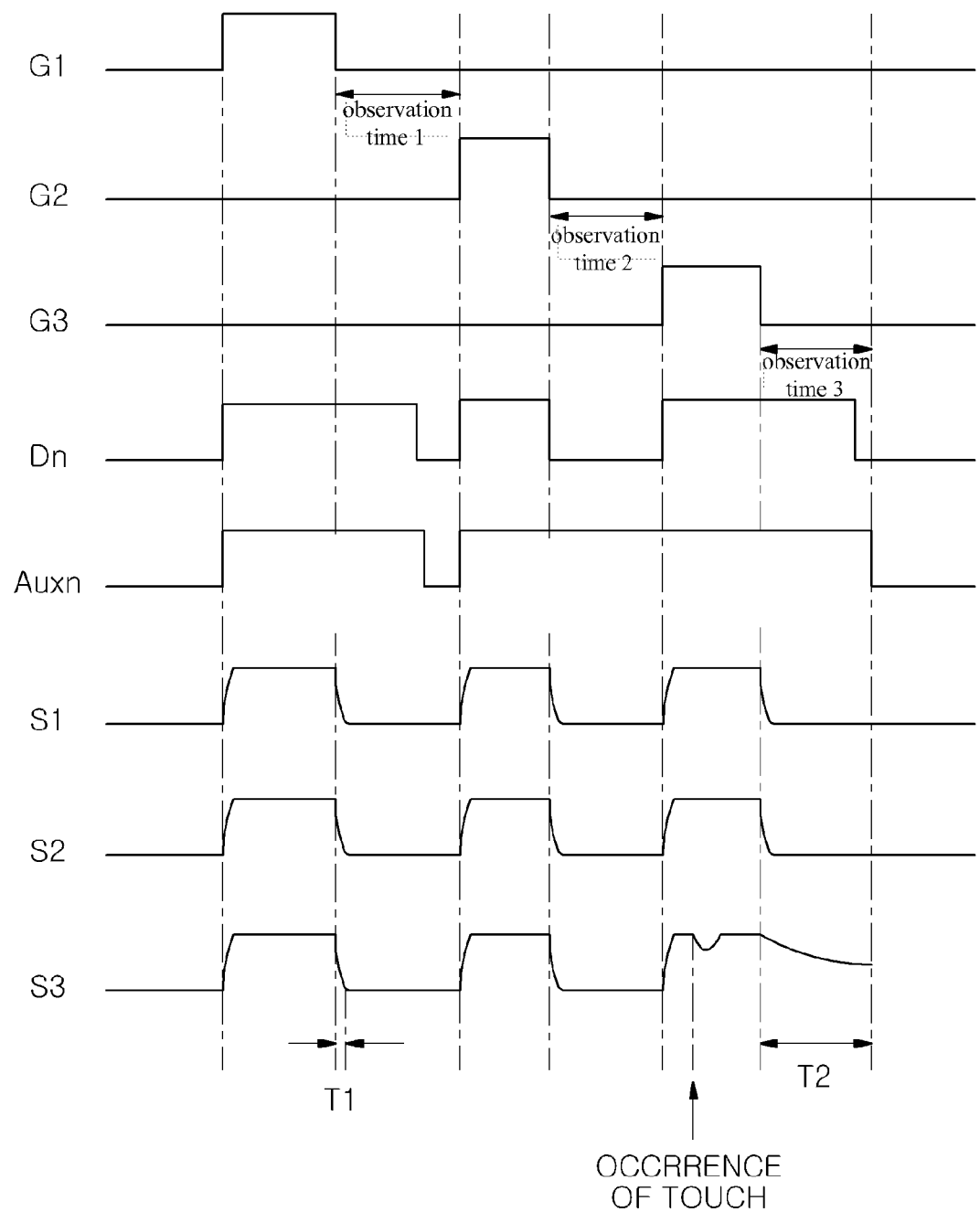
FIG. 11 a waveform diagram showing an example of recognizing touch signals in the FIG. 9 embodiment.

FIG. 11 is a waveform diagram showing an example of acquiring a touch signal in the embodiment of FIG. 9. Referring to FIG. 11, the touch position detecting portion 70 offers a scan pulse sequentially to each gate signal line 36. The gate signal Gn offered by the touch position detecting portion 70 has a voltage level of a sufficient size so that the gate electrode of the first TFT 42 enters an active area. Fox example, the gate signal Gn is preferably set to be larger by 3V or higher than the position detection signal Dn. In the case of a preferred embodiment of the present invention, the high (Hi) voltage level of the position detection signal Dn is 13V and the high (Hi) voltage level of the gate signal Gn is 18V. In addition, in order to turn off the first TFT 42 stably, the gate OFF voltage is set to be at a range of −5 to −7V.

The gate signal Gn has enough observation time between the respective signals. This is to make the virtual capacitor formed between the finger of the human body and the conductive pad 50 according to an approach of the human body, have a sufficient charging time. As illustrated, a pause period of a sufficient observation time 1 is given between the gate signals G1 and G2. In the case that any one of the gate signals Gn is at a high state (Hi), the position detection signal Dn that is applied through the first signal line 32 is offered to keep a high state (Hi). Preferably, when one gate signal Gn is at a pause period, the position detection signal Dn also has a slight pause period.

The touch position detecting portion 70 offers an observation voltage through the auxiliary signal lines 37. The auxiliary signal Auxn offers an observation voltage lower by 3V or more than 13V that is a voltage that is charged between the finger and the conductive pad 50 by the position detection signal Dn at a high (Hi) level. For example, it is enough that the observation voltage of the auxiliary signal Auxn is about 5V.

Referring to FIG. 11, the waveform that is obtained through the second signal lines 34 and the process of acquiring the touch signal through the waveform will follow.

If a human body does not approach although the gate signal has been applied and then the observation time has passed, as in the case that the gate signals G1 and G2 are applied, the signals Sn that are obtained through the second signal lines 34 have the waveform illustrated. This is because the electrostatic capacity is not formed in the conductive pad 50 since the human body has not approached. In more detail, when the gate signal G1 is applied, the first TFT 42 is turned on. In this case, since the voltage level that is applied to the gate electrode of the second TFT 44 is larger than that that is applied to the input electrode of the second TFT 44 through the auxiliary signal line 37, the second TFT 44 is also turned on. By the way, because wiring resistance and parasitic electrostatic capacity of the second signal line 44 exist as illustrated, the signals Sn have a curved line in a section ascending up to a high (Hi) level and a section descending down to a low (Lo) level, respectively. As illustrated, it is assumed that a time from the immediate time after the first TFT 42 has become turned off by the gate signal G1 and has been changed into an observation time, to the time the gate voltage of the second TFT 44 descends sharply and the signal Sn that is obtained descends at a low (Lo) level perfectly, is "T1." Here, a time delay that occurs in the output signals Sn in comparison with the input signals Dn in the waveform diagram of FIG. 11 has been ignored.

If a bodily approach is achieved to a right-lower touch cell 60 of FIG. 9 at a certain point in time, an electrostatic capacity will be formed between the conductive pad 50 and the bodily finger in the corresponding touch cell 60. As can be seen from the waveform of FIG. 11, if a touch occurs in a section where the gate signal G3 is at a high (Hi) level, a virtual capacitor is formed at a moment the bodily finger approaches to the conductive pad 50. Here, as the waveform of S3 is distorted at a touch occurrence point in time in the waveform diagram of FIG. 11, charge voltage can be varied at a charge beginning time. However, the S3 waveform rises up to a high (Hi) level as soon as charging is ended.

By the way, in the case that the mode of the G3 signal is changed into an observation time, that is, in the case that the G3 signal is turned off, voltage that is charged in the virtual capacitor is discharged, and the gate voltage of the seconds TFT 44 descends slowly. As can be seen from the S3 waveform, the output waveform of the second TFT 44 exhibits a unique output characteristic. Here, a time that is taken for the Sn waveform to fall down to 50% or below is assumed "T2."

Referring to the waveform diagram of FIG. 11, it can be seen that the times T1 and T2 have a considerable time difference therebetween. The touch position detecting portion 70 can acquire a touch signal by reading and deciphering a time that is taken for the waveform of the signal Sn that has been obtained through the second signal line 34 after the gate signal Gn has been turned off as described above OFF to descend or descending voltage at a certain point in time. Because the signal S3 has been acquired at an observation time after the gate signal G3 has been turned off in the case of the touch signal in this example, the acquired touch signal has a coordinate value corresponding to "D3, S3."

The embodiment of FIG. 11 is one embodiment for acquiring a touch signal. It is possible to acquire the touch signal by an alternative method that differs from the FIG. 11 embodiment. For example, according to the alternative method, after all the gate signals Gn have been turned on all at once, to thus induce the virtual capacitor formed between the human body and the conductive pad 50 to be charged, signals are sequentially applied to the auxiliary signal lines 37 to thereby observe output waveform.

Otherwise, a method of detecting electric current can be used. As one embodiment of this case, the auxiliary signal lines 37 are at the reference voltage, fox example, as the ground electric potential that electric current flows. The touch signal drive IC 71 applies the reference voltage to the second signal line 34, and detects size of the electric current flowing when the gate signal Gn has become high and thus the second TFT 44 has been turned on, to thereby judge whether or not a touch has been input. It is obvious to one of ordinary skill in the art that the method of acquiring the touch signal can be implemented in various forms according to the technological spirit of the present invention.

The embodiment illustrated in FIG. 9 is the embodiment of acquiring the touch signal by the electrostatic capacity that has been produced by the approach of the human body as described above. Here, it may be assumed that the touch input unit 90 such as the finger of the human body contacts the conductive pad 50. Of course, the electrostatic capacity of several pF may occur and the touch signal can be acquired using the electrostatic capacity even in this case. However, if an actual capacitor 54 is additionally connected to the conductive pad 50, the actual capacitor 54 and the virtual capacitor that is formed by the human body share charges, that is, they perform a charge sharing function. Accordingly, the gate potential of the second TFT 44 falls down or the charging time becomes longer. Therefore, if the gate potential of the second TFT 44 and the charging time have been detected, the touch signal can be more stably obtained with respect to the bodily contact.

Figure 12:
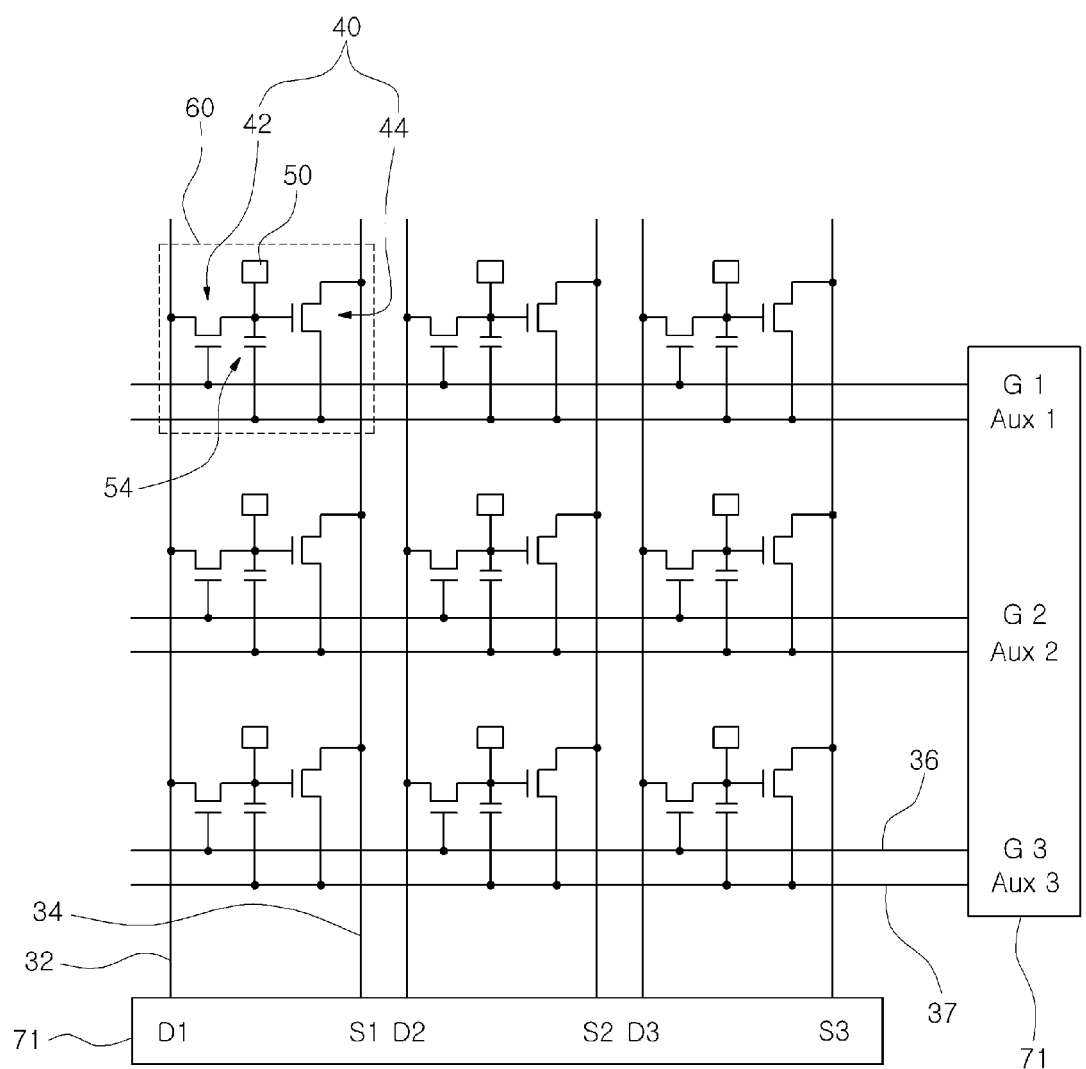
FIG. 12 is a configurational diagram showing still another embodiment of an upper substrate according to the present invention.
Figure 13:
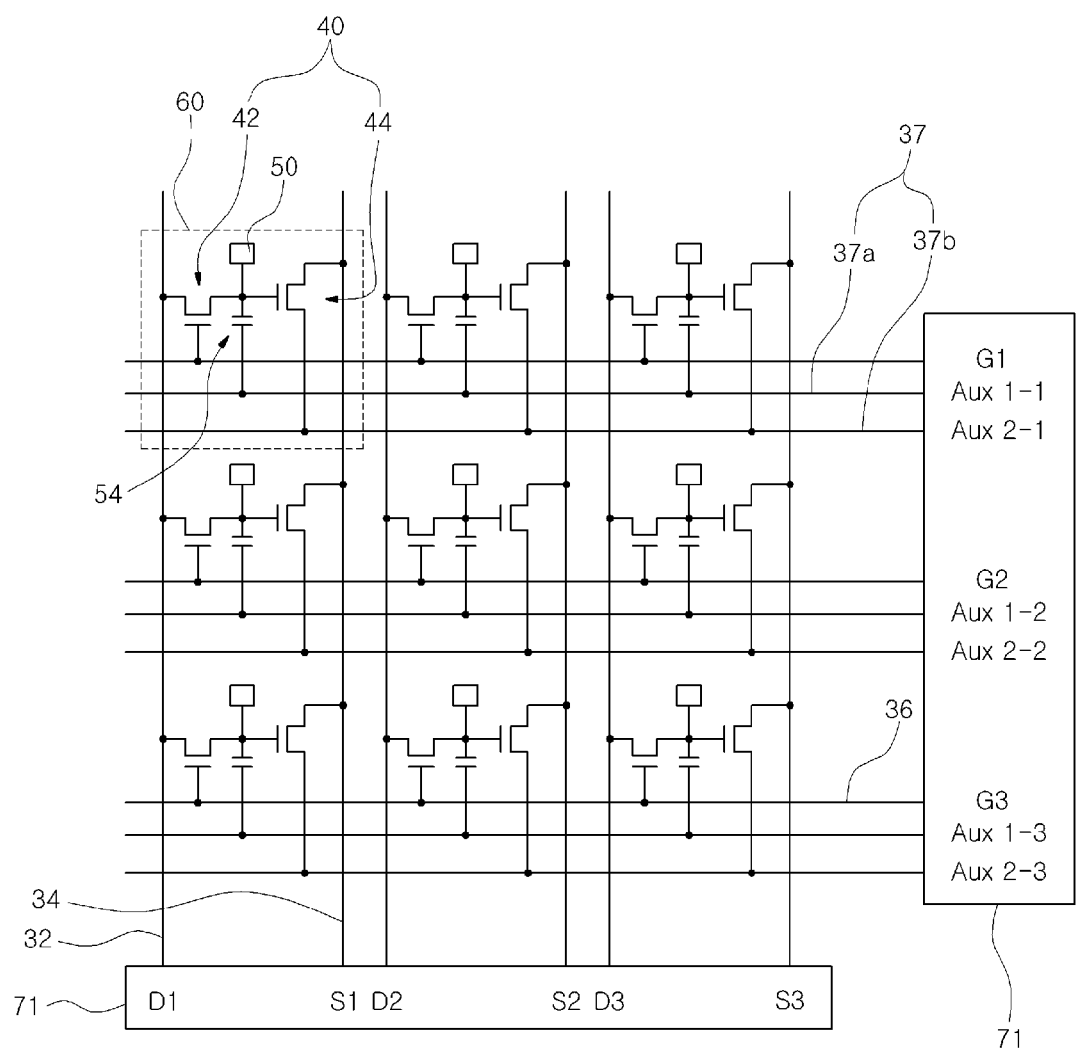
FIG. 13 is a configurational diagram showing yet another embodiment of an upper substrate according to the present invention.

FIGS. 12 and 13 show embodiments of acquiring a touch signal more stably in the case that the human body contacts the conductive pad 50, as described above. Of course, touch signal occurrence can be also stably secured by a non-contact of the human body in this embodiment.

Referring to FIG. 12, in addition to the embodiment of FIG. 9, a capacitor 54 is further connected between the output electrode of the first TFT 42 and the auxiliary signal line 37. The touch position detecting portion 70 can sequentially apply a scan pulse to the respective gate signal lines even in this embodiment, or an identical gate signal can be applied to all the gate signal lines 36.

There is no need necessarily to connect the gate signal Gn with the auxiliary signal Auxn for observation. The gate signal Gn and the auxiliary signal Auxn for observation can be applied separatively in this embodiment. Here, if too much time passes after the capacitor 54 has been charged by the gate signal Gn, free discharging occurs in the capacitor 54 to thereby disable observation. Thus, it is desirable to apply the auxiliary signal Auxn immediately after the capacitor 54 has been charged by the gate signal Gn.

As one embodiment of the present invention, a turn-on (ON) voltage of the gate signal Gn is set as 15V. When the gate signal Gn is applied, the position detection signal Dn is also applied, to thus charge the capacitor 54 that is connected to the gate electrode of the second TFT 44. Since the high (Hi) level potential of the position detection signal Dn is a turn-on (ON) voltage that turns on the second TFT 44, it is appropriate that the turn-on (ON) voltage is about 10V considering the relationship with the gate signal Gn. The position detection signal Dn is provided for a time sufficient to charge the capacitor 54.

Since the gate voltage of the second TFT 44 is bigger by 3V or above than the voltage of the auxiliary signal Auxn, the second TFT 44 is always turned on. If a bodily contact is achieved in the right-lower touch cell 60 at a point in time that the auxiliary signal Auxn for observation is applied, charges stored in the capacitor 54 are discharged and moves to the virtual capacitor formed by the human body. This continues until two capacitors are at the identical potential. If the charging capacity of the capacitor 54 is sufficiently less than that of the virtual capacitor that is formed by the human body, this charge sharing occurs and a point in time at which the second TFT 44 is not turned on, or a point in time at which size of the output signal Sn is lowered happen in view of the relationship in size between the voltage that is applied to the gate of the second TFT 44 and the auxiliary voltage Auxn. The touch signal can be acquired by reading and deciphering the point in time at which the second TFT 44 is not turned on, or the point in time at which size of the output signal Sn is lowered. Even in this embodiment, the acquired touch signal is a coordinate value corresponding to "D3, S3."

Referring to FIG. 13, the auxiliary signal line 37 is divided into a first auxiliary signal line 37a and a second auxiliary signal line 37b. Meanwhile, one end portion of the capacitor 54 is connected to the first auxiliary signal line 37a, and the input electrode of the second TFT 44 is connected to the second auxiliary signal line 37b.

This embodiment differs from the embodiment of FIG. 12 in view of only a point that the auxiliary signal is separated into an auxiliary signal for observation and an auxiliary signal for state monitoring, but the former is identical to the latter in view of the other points. An auxiliary signal Aux1-$n$ is applied to the first auxiliary signal line 37a for observation, and an auxiliary signal Aux2-$n$ is applied to the second auxiliary signal line 37b for state monitoring.

The turn-on (ON) of the gate signal Gn is set as 18V in this embodiment. The high (Hi) level electric potential of the position detection signal Dn is suitably about 12V as the voltage that turns on the second TFT 44. The auxiliary signal Aux1-$n$ for observation has the voltage of −18V at the low (Lo) level, and an electric potential of zero (0) volt at the high (Hi) level, as one embodiment. Fox example, when the auxiliary signal Aux1-$n$ is at the low (Lo) level and the capacitor 54 has been charged, the gate potential of the second TFT 44 goes down to −6V, and thus the second TFT 44 is not turned on with respect to the second auxiliary signal line 37b having the voltage bigger than the gate potential. In addition, since the high (Hi) level electric potential of the position detection signal Dn is 12V at the high (Hi) level of the auxiliary signal Aux1-$n$, that is, zero volt, it is guaranteed that the second TFT 44 is stably turned on with respect to the auxiliary signal Aux2-$n$ that is smaller by 3V or below than that of the auxiliary signal Aux1-$n$. It is preferable that the auxiliary signal Aux2-$n$ is synchronized with the auxiliary signal Aux1-$n$. In addition, it is preferable that the electric potentials at the high (Hi) and low (Lo) levels of the auxiliary signal Aux2-$n$ equal those of the auxiliary signal Aux1-$n$.

In the embodiment of FIGS. 12 and 13, the voltage that is applied to the gate electrode of the second TFT 44 can be controlled after charge sharing by selecting the electrostatic capacity of the capacitor 54 in various forms, and this controlled voltage becomes a factor of deciding a descending slope of the waveform of the Sn signal as soon as a touch has been achieved. That is, width of selecting the voltage level of each signal is widened by adding the capacitor 54, and the touch signal can be acquired stably by making the descending slope of the Sn signal slower.

In the embodiment of FIGS. 12 and 13, the method of discriminating the high or low state of the voltage formed in the capacitor 54 and detecting the touch signal can be implemented in various forms. As an embodiment, a display device manufacturer measures a voltage range of the capacitor 54 when a touch does not occur, and a voltage range of the capacitor 54 when a touch occurs, through the second signal lines 34, and inputs the two measurements to the touch position detecting portion 70. Then, the touch position detecting portion 70 takes advantage of the two measurements as reference data at a time of discriminating whether or not a touch occurs. For this purpose, the touch position detecting portion 70 includes a comparator that is not illustrated. The voltage that is input by the display device manufacturer is used as the reference voltage of the comparator, and size of voltage that is received through the second signal line 34 is discriminated, to thus distinguish existence and nonexistence of a touch. In addition, the touch position detecting portion 70 has a timer that is not illustrated, to thus discriminate difference in the charging time by the timer and distinguish existence and nonexistence of a touch.

Figure 14:
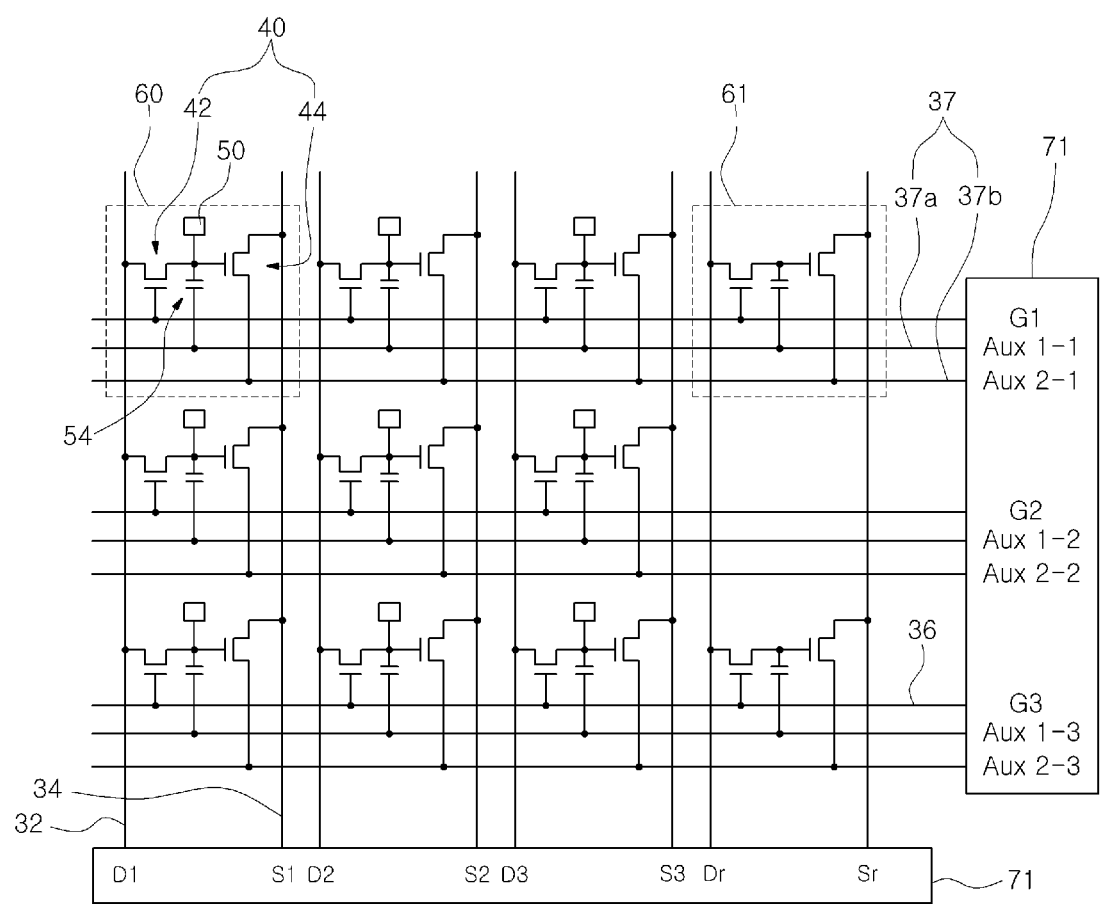
FIG. 14 is a configurational diagram showing an example of installing sensing touch cells in FIG. 13.

As an alternative embodiment, sensing touch cells 61 are installed on the upper substrate 30 as illustrated in FIG. 14, and a reference signal is measured using the sensing touch cells 61. The sensing touch cells 61 can be installed in various forms. Fox example, each of the sensing touch cells 61 can measure size of electric current with one or a plurality of TFTs. Preferably, the sensing touch cell 61 has the same circuit composition as that of the touch cell 60 as illustrated in FIG. 14, but has a structure that the conductive pad 50 has been removed. The sensing touch cell 61 does not include a conductive pad 50, to thus form no electrostatic capacity with respect to the finger. That is, a signal Sr output from the sensing touch cell 61 is similar to the signals S1-S3 output from the touch cells 60 where no touches occur.

Here, the touch position detecting portion 70 uses the signal Sr that has been measured from the sensing touch cell 61 as the reference voltage of the comparator, and judges that a touch occurs with respect to the signal lower than the reference voltage among the position detection signal S1-S3 detected in the second signal line 34. According to this method, the display device manufacturer can exclude a process of measuring and inputting the reference voltage of the comparator separately, to thereby enhance a productive efficiency.

Meanwhile, lengths of the first signal line 32 and the second signal line 34 differ by position of the touch cell 60 located on the upper substrate 30. Accordingly, in the case that the display device becomes scaled up, difference in the wiring resistance due to the lengths of the signal lines 32 and 34 cannot be ignored. As this difference alters a charging and discharging time constant of the voltage charged in and discharged from the capacitor 54 that has been connected in the touch cell 60, difference of measurement voltage or difference of measurement time is caused to thus make it difficult to measure a correct touch signal.

Figure 15:
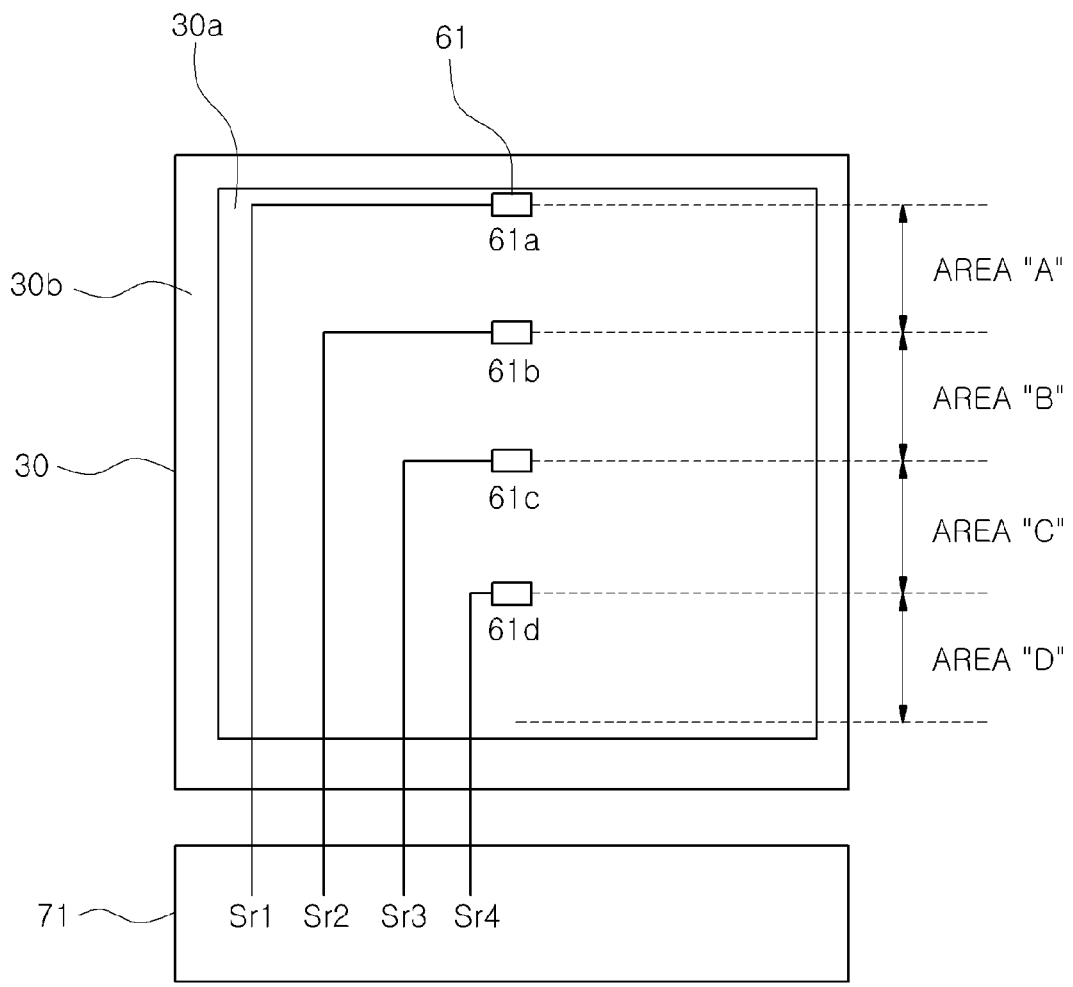
FIG. 15 is a configurational diagram conceptually showing an embodiment of solving a measurement error due to a difference in a wiring resistance using the sensing touch cells of FIG. 14.

FIG. 15 is a configurational diagram conceptually showing an embodiment of solving a measurement error due to a difference in a wiring resistance using the sensing touch cells of FIG. 14. Referring to FIG. 15, an active area 30 where touch inputs are formed on the upper substrate 30 is divided into a plurality of areas. A sensing touch cell 61 is installed in each of the divided areas. Voltage that is measured in the capacitor 54 that is connected with the sensing touch cell 61 becomes the reference voltage of the comparator for measurement of the position detection signal in the corresponding area in which the sensing touch cell 61 is installed.

That is, voltage Sr1 that is detected in the capacitor 54 of the sensing touch cell 61 or 61a becomes reference voltage of the comparator for detection of touch inputs that has occurred in an area "A" of FIG. 15, and voltage Sr2 that is detected in the capacitor 54 of the sensing touch cell 61 or 61b becomes reference voltage of the comparator for detection of touch inputs that has occurred in an area "B" of FIG. 15. As a result, to judge existence and nonexistence of a touch in the touch cell 60 within the divided area, voltage that is measured in the sensing touch cell 61 having lengths of the similar signal lines 32 and 34 in an identical divided area becomes reference voltage. Accordingly, a measurement error due to the wiring resistance of the signal lines 32 and 34 can be minimized.

The sensing touch cells 61 that have been installed in the active area 30a of the upper substrate 30 have been illustrated in FIG. 15. However, the sensing touch cells 61 can be installed in a non-active area 30b that touch inputs are not achieved on the upper substrate 30. In this case, although the sensing touch cells 61 have been installed, transmissivity of the upper substrate 30 does not fall. In addition, the method of using the voltage measured in the sensing touch cell 61 as the reference voltage has been illustrated, but electric current measured in the sensing touch cell 61 may be used as a reference signal.

The aforementioned embodiments have been illustrated with respect to the case where the conductive pad 50 is connected to the gate electrode of the switching element 40, in view of composition of each touch cell 60. However, the conductive pad 50 can be connected to the input electrode or the output electrode of the switching element 40 not the gate electrode of the switching element 40, and circuit composition in each touch cell can be also differently formed.

Fox example, the conductive pad 50 is connected to the input electrode of the switching element 40, the first signal line 32 is connected to the gate electrode thereof, and the second signal line 34 is connected to the output electrode thereof. In addition, an on/off control signal of the switching element is applied to the first signal line 32, and the signal that is obtained from the second signal line 34 is detected, to thereby acquire a touch signal.

In addition, the bodily finger has been described as the touch input unit 90 in the embodiments, but the touch input unit 90 can be replaced with other units such as an iron pen or an electronic pen generating an electrical signal. Fox example, in the case that an electronic pen generating an electrical signal is used as the touch input unit 90, an electrostatic capacity is formed between the electronic pen and the conductive pad by the electrical signal generated from the electronic pen. In this case, the switching element 40 is on/off controlled to thus detect a touch input of the electronic pen. Accordingly, circuit composition of the touch cell 60 can be further simplified.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The invention claimed is:

1. A display device having a built-in touch input unit, the display device comprising:
    a lower substrate in which a pixel portion having pixels and pixel electrodes is arranged;
    an upper substrate that is arranged at a distance from the lower substrate;
    a plurality of first signal lines and second signal lines that are arranged on the upper surface or lower surface of the upper substrate and through which a position detection signal is transmitted and received;
    a plurality of touch cells disposed on the upper surface or the lower surface of the upper substrate, wherein the plurality of touch cells are formed by dividing an active area into a plurality of areas where a touch is achieved into the plurality of areas, each of the plurality of touch cells comprising a conductive pad and a 3-terminal type switching element, wherein the conductive pad forms an electrostatic capacity between a touch input means including a bodily finger or other tools having an electrical property similar to the bodily finger and the conductive pad when the touch input means and the conductive pad are within a predetermined distance (d) in each divided area, and the 3-terminal type switching element having a gate electrode is connected to the respective conductive pad and has respectively different output signals according to an electric potential of the conductive pad; and
    a touch position detector that transmits and receives position detection signals to and from the first signal lines and the second signal lines, and detects whether the output signals of the switching element are changed by capacitance that is formed between the touch input means and the conductive pad, to thereby acquire a coordinate signal of the touch cell on which the touch input has occurred.

2. The display device according to claim 1, wherein the display device is one of LCD(Liquid Crystal Display), PDP (Plasma Display Panel), OLED(Organic Light Emitting Diode), and AMOLED (Active Matrix Organic Light Emitting Diode).

3. The display device according to claim 1, wherein the lower substrate is a TFT (Thin Film Transistor) substrate in which a TFT (Thin Film Transistor) is arranged by a unit pixel, and both a gate line and a data line for applying an on/off control signal and a data signal are arranged.

4. The display device according to claim 1, wherein the switching element is a TFT (Thin Film Transistor).

5. The display device according to claim 1, wherein a plurality of auxiliary signal lines are further arranged on the upper surface or the lower surface of the upper substrate, and wherein the gate electrode of the switching element of the touch cell is connected to the first signal line, and an input electrode and an output electrode of the switching element are connected to one of the plurality of auxiliary signal lines and one of the second signal lines, respectively.

6. The display device according to claim 1, wherein a plurality of gate signal lines and a plurality of auxiliary signal lines are further arranged on the upper surface or lower surface of the upper substrate,
    wherein the switching element of each touch cell comprises: a first switching element whose input electrode is connected to the first signal line, whose gate electrode is connected to one of the gate signal lines and whose output electrode is connected to the conductive pad; and a second switching element whose gate electrode is connected to the conductive pad and whose input electrode and output electrode are connected to one of the auxiliary signal lines and one of the second signal lines, respectively, and
    wherein the touch position detector applies gate signals for turning on and off the first switching element to the gate signal lines, respectively.

7. The display device according to claim 6, wherein a capacitor is further connected between the output electrode of the first switching element and the one of the auxiliary signal lines.

8. The display device according to claim 7, wherein a first auxiliary signal line and a second auxiliary signal line are provided separately as the auxiliary signal lines and the input electrode of the second switching element and one end of the capacitor are connected to respectively the first and second auxiliary signal lines.

9. The display device according to claim 1, wherein a plurality of sensing touch cells are further formed for measurement of a reference signal to be compared with the position detection signal received from the second signal line on the upper surface or the lower surface of the upper substrate.

10. The display device according to claim 9, wherein each sensing touch cell is formed in the same manner as that of the touch cell excluding the conductive pad which is removed.

11. The display device according to claim 9, wherein the sensing touch cells are respectively installed in areas that are formed by dividing the upper substrate into the plurality of areas, and the reference signal measured from the sensing touch cells within each area is used as the reference signal to be compared with the position detection signal of the corresponding area.

12. The display device according to claim 1, wherein a light shield layer to intercept light is formed on the upper portion of the switching element.

13. The display device according to claim 1, wherein a transparent insulation layer that protects the touch cells is coated on the upper surface or lower surface of the upper substrate.

14. The display device according to claim 1, wherein the touch position detector detects the position detection signal that is received from the second signal line on a digital basis.

15. The display device according to claim 1, wherein the touch position detector intercepts the position detection signal or the on/off control signal applied to the touch cell at which a touch position detection has been finished, to thereby reset the corresponding touch cell.

16. The display device according to claim 1, wherein the touch position detector further comprises a memory unit that has addresses corresponding to coordinate values of the touch cells, and stores the coordinate value of the corresponding touch cell in the corresponding address of the memory unit if the position detection signal has been received from the second signal line.

17. The display device according to claim 1, wherein unit pixels are arranged in a matrix form on the lower substrate, and the touch cells of the upper substrate are arranged in a resolution having a real number of times in comparison with the unit pixels.

18. The display device according to claim 17, wherein at least one or more signal lines among the signal lines for detecting touch inputs that are arranged on the upper substrate are disposed on the same vertical line as that of at least one signal line among the signal lines for displaying images that are arranged on the lower substrate.

19. The display device according to claim 1, wherein at least one or more signal lines among the signal lines for detecting touch inputs that are arranged on the upper substrate are disposed along an oblique line with respect to at least one signal line among the signal lines for displaying images that are arranged on the lower substrate.

* * * * *